United States Patent
Morales et al.

(10) Patent No.: US 12,236,624 B2
(45) Date of Patent: Feb. 25, 2025

(54) OPTICAL CALIPER FOR 3-D ENDOSCOPIC IMAGING AND MEASUREMENT

(71) Applicants: Smith & Nephew, Inc., Memphis, TN (US); Smith & Nephew Orthopaedics AG, Zug (CH); Smith & Nephew Asia Pacific Pte Limited, Singapore (SG)

(72) Inventors: Carlos Omar Morales, Tewksbury, MA (US); Xuanye Wang, Reading, MA (US); Eduardo Tepichin-Rodríguez, Puebla (MX); Andrea-Fernanda Muñoz-Potosí, Santander (CO); Luis-Gabriel Valdivieso-González, Santander (CO); Ponciano Rodriguez-Montero, Puebla (MX)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 197 days.

(21) Appl. No.: 17/483,305

(22) Filed: Sep. 23, 2021

(65) Prior Publication Data
US 2022/0092805 A1    Mar. 24, 2022

Related U.S. Application Data

(60) Provisional application No. 63/082,056, filed on Sep. 23, 2020.

(51) Int. Cl.
*G06T 7/521* (2017.01)
*G06T 5/50* (2006.01)
(Continued)

(52) U.S. Cl.
CPC .............. *G06T 7/521* (2017.01); *G06T 5/50* (2013.01); *G06T 7/10* (2017.01); *G06T 15/06* (2013.01);
(Continued)

(58) Field of Classification Search
CPC  G06T 7/215; G06T 7/521; G06T 5/50; G06T 7/10; G06T 15/06;
(Continued)

(56) References Cited

U.S. PATENT DOCUMENTS

| 5,200,838 A | 4/1993 | Nudelman et al. |
| 7,061,628 B2 * | 6/2006 | Franke ............... G01B 11/2504 356/604 |

(Continued)

FOREIGN PATENT DOCUMENTS

| CN | 110840386 A | 2/2020 |
| CN | 111685711 A | 9/2020 |

(Continued)

OTHER PUBLICATIONS

Tepichin-Rodriguez et al., "Talbot effect based tunable setup for the measurement of stepped surfaces: Plane and spherical wavefront illumination," Optics Communications 473 (2020) 126044, pp. 1-8.
(Continued)

*Primary Examiner* — Edward F Urban
*Assistant Examiner* — Benedict E Lee
(74) *Attorney, Agent, or Firm* — Dickinson Wright PLLC

(57) ABSTRACT

A system for an endoscope includes a camera head coupled to an optical channel. The system also includes a light port coupled to the endoscope and configured to receive a first light ray, wherein the first light ray travels through a first optical path along an optical axis of the optical channel. The system also includes a depth measurement module coupled to the endoscope, wherein the depth measurement module is
(Continued)

configured to transmit a second light ray through a second optical path along the optical axis. The system also includes an image sensor coupled to the camera head and configured to receive a first set of images pertaining to the first light ray and a second set of images pertaining to the second light ray. The system also includes a processing device configured to use the first and second sets of images to generate one or more 3-D images.

20 Claims, 23 Drawing Sheets

(51) Int. Cl.
  *G06T 7/10* (2017.01)
  *G06T 15/06* (2011.01)
(52) U.S. Cl.
  CPC ........... *G06T 2207/10048* (2013.01); *G06T 2207/10068* (2013.01)
(58) Field of Classification Search
  CPC . G06T 2207/10048; G06T 2207/10068; G06T 2210/41; G06T 17/00; H04N 23/80; H04N 23/70
  See application file for complete search history.

(56) References Cited

U.S. PATENT DOCUMENTS

| | | | | |
|---|---|---|---|---|
| 7,453,581 | B2* | 11/2008 | Greve | G01M 11/0221 |
| | | | | 356/609 |
| 8,444,652 | B2 | 5/2013 | Amis et al. | |
| 9,689,809 | B2* | 6/2017 | Buchwald | G01M 11/04 |
| 9,782,056 | B2* | 10/2017 | McDowall | H04N 23/56 |
| 10,307,296 | B2 | 6/2019 | Tan et al. | |
| 10,499,996 | B2 | 12/2019 | de Almeida Barreto | |
| 10,750,151 | B2* | 8/2020 | Babayoff | G01J 3/0243 |
| 10,973,398 | B2* | 4/2021 | McDowall | A61B 1/000095 |
| 11,321,860 | B2* | 5/2022 | Matsumoto | G06T 7/521 |
| 11,457,981 | B2* | 10/2022 | Govari | G06T 7/33 |
| 11,593,946 | B2* | 2/2023 | Miyata | A61B 1/0638 |
| 2008/0278809 | A1* | 11/2008 | Redert | G02B 26/005 |
| | | | | 348/E13.028 |
| 2011/0017827 | A1* | 1/2011 | Hayashi | G06K 7/10722 |
| | | | | 348/E5.037 |
| 2011/0181748 | A1* | 7/2011 | Ohnishi | H04N 23/61 |
| | | | | 348/222.1 |
| 2013/0050833 | A1* | 2/2013 | Lewis | G06T 7/73 |
| | | | | 359/630 |
| 2013/0335531 | A1* | 12/2013 | Lee | G01B 11/25 |
| | | | | 348/46 |
| 2015/0346475 | A1* | 12/2015 | Moriuchi | G02B 7/38 |
| | | | | 349/1 |
| 2015/0351967 | A1 | 12/2015 | Lim et al. | |
| 2016/0223754 | A1* | 8/2016 | Yamazaki | G02B 6/3624 |
| 2017/0085789 | A1* | 3/2017 | Tatsuta | G02B 21/241 |
| 2018/0284429 | A1* | 10/2018 | He | G03B 43/00 |
| 2020/0218057 | A1* | 7/2020 | Blazejewski | G02B 23/2415 |
| 2021/0051270 | A1* | 2/2021 | Ohta | H04N 23/6811 |
| 2021/0161718 | A1 | 6/2021 | Ng et al. | |
| 2021/0196384 | A1* | 7/2021 | Shelton, IV | G06T 15/20 |
| 2023/0186476 | A1* | 6/2023 | Ghazvinian Zanjani | |
| | | | | G06T 7/10 |
| | | | | 706/20 |

FOREIGN PATENT DOCUMENTS

| | | | |
|---|---|---|---|
| EP | 2720013 A2 * | 4/2014 | ......... G01B 11/026 |
| JP | 5909443 B2 * | 4/2016 | ............ H04N 13/10 |
| WO | 2021071988 A1 | 4/2021 | |
| WO | 2021071991 A1 | 4/2021 | |
| WO | 2021168408 A1 | 8/2021 | |
| WO | 2021203077 A1 | 10/2021 | |
| WO | 2021203082 A1 | 10/2021 | |
| WO | 2021257672 A1 | 12/2021 | |
| WO | 2022006041 A1 | 1/2022 | |
| WO | 2022006248 A1 | 1/2022 | |
| WO | 2022159726 A1 | 7/2022 | |

OTHER PUBLICATIONS

Wen et al., "The talbot effect: recent advances in classical optics, nonlinear optics, and quantum optics," 2013, Advances in optics and photonics, 5(1), pp. 83-130.
International Patent Application No. PCT/US2022/041845 filed Aug. 29, 2022 listing Quist, Brian William as first Inventor, entitled, "Methods and Systems of Ligament Repair," 108 pages.

* cited by examiner

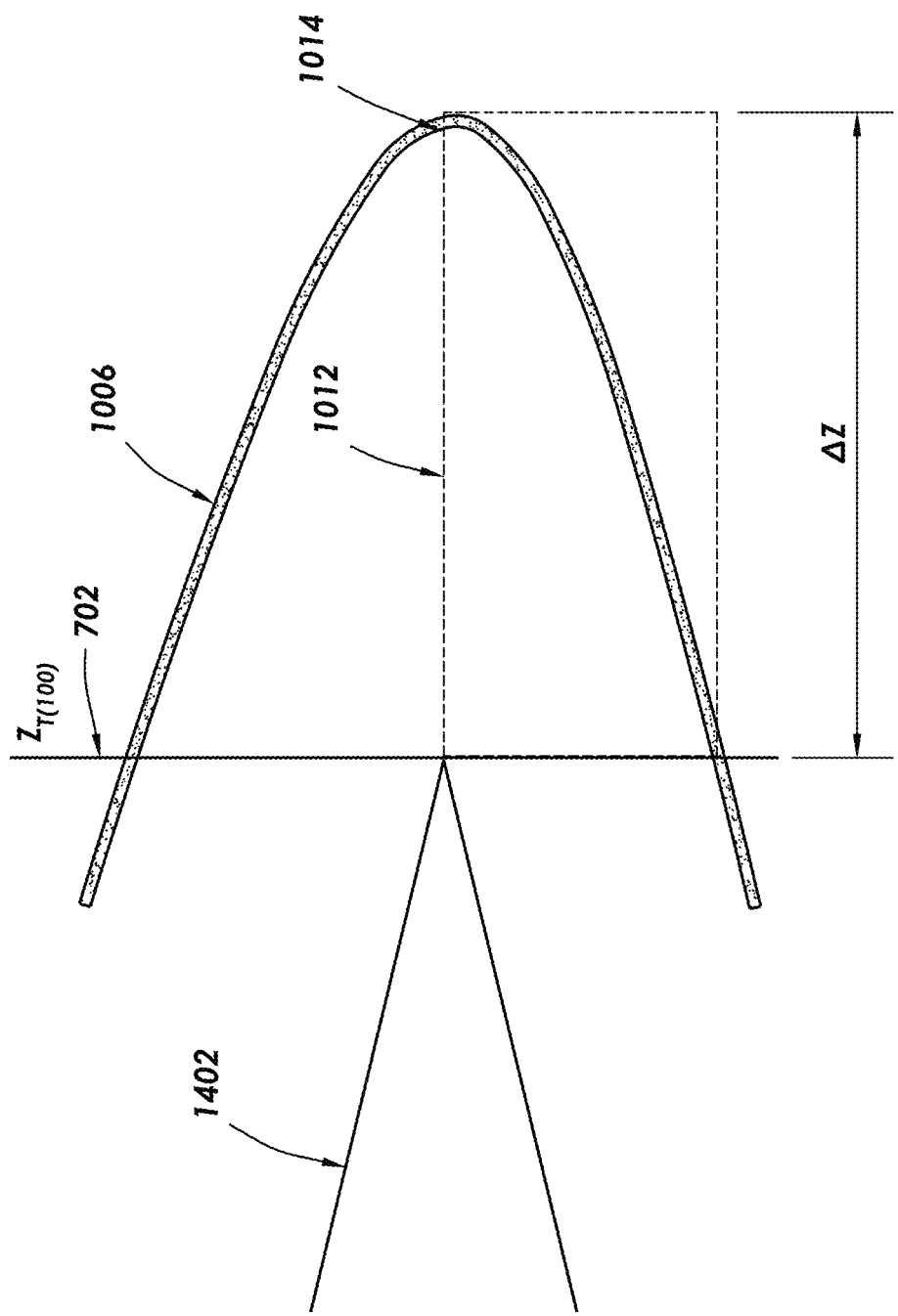

OPTICAL CALIPER FOR 3-D ENDOSCOPIC IMAGING AND MEASUREMENT

CROSS-REFERENCE TO RELATED APPLICATIONS

This application claims priority to and the benefit of U.S. Provisional Patent Application Ser. No. 63/082,056, filed Sep. 23, 2020, titled "Optical Caliper for 3-D Endoscopic Imaging and Measurement," the entire disclosure of which is hereby incorporated by reference for all purposes.

BACKGROUND

An endoscope is a tool that provides visualization of a structure inside the body of a patient during a medical procedure, including a minimally invasive surgery. The endoscope can be used to examine a surface of the structure, cavities, channels, and recesses of the structure. A lighting system can be used to illuminate the structures. An imaging system can be used to capture, as an image, the information contained in the light reflected by the surface. The images captured by the endoscope can be displayed on a display unit, such as a monitor or screen, for a medical professional to view in real-time or near real-time.

SUMMARY

In general, the present disclosure provides systems and methods for 3-D endoscopic imaging and measurement.

An aspect of the disclosed embodiments includes a system for an endoscope. The system also includes a camera head coupled to an optical channel. The system also includes a light port coupled to the endoscope and configured to receive a first light ray, wherein the first light ray travels through a first optical path along an optical axis of the optical channel. The system also includes a depth measurement module coupled to the endoscope, wherein the depth measurement module is configured to transmit a second light ray through a second optical path along the optical axis. The system also includes an image sensor coupled to the camera head and configured to receive a first set of images pertaining to the first light ray and a second set of images pertaining to the second light ray. The system also includes a processing device configured to receive the first and second sets of images from the image sensor and use the first and second sets of images to generate one or more 3-D images.

Another aspect of the disclosed embodiments includes a method for generating a 3-D image of an object. The method includes transmitting a first light ray through a first optical path along an optical axis of an optical channel. The method also includes transmitting a second light ray through a second optical path along the optical axis. The method also includes receiving a first set of images captured by an image sensor, wherein the first set of images pertain to the first light ray. The method also includes receiving a second set of images captured from the image sensor, wherein the second set of images pertain to the second light ray. The method also includes generating, using the first and second sets of images, 3-D image.

Another aspect of the disclosed embodiments includes a system for an endoscope. The system includes a camera head coupled to an optical channel. The system also includes a light port coupled to the endoscope and configured to receive a first light ray, wherein the first light ray travels through a first optical path along an optical axis of the optical channel. The system also includes a depth measurement module coupled to the endoscope, wherein the depth measurement module is configured to generate a grid pattern and transmit the grid pattern and a second light ray toward a beam splitter, wherein the beam splitter is configured to reflect at least a portion of the grid pattern and the second light ray through the optical axis. The system also includes an image sensor configured to receive a first set of images captured from the camera, wherein the first set of images pertain to the first light ray. The system also includes a second image sensor configured to receive a second set of images captured from the camera, wherein the second set of images pertain to the second light ray. The system also includes a processing device configured to receive the first and second sets of images and the grid pattern from the image sensors and use the first and second sets of images and the grid pattern to generate one or more 3-D images.

BRIEF DESCRIPTION OF THE DRAWINGS

For a detailed description of example embodiments, reference will now be made to the accompanying drawings in which:

FIG. 14 shows a schematic of the second grating in a second position in accordance with at least some embodiments;

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Receiving . . . depth information" shall mean receiving data indicative of a depth, a density, a grating, a location, a frequency, phase information, or any other desired image data on a structure within a coordinate space (e.g., a coordinate space of a view of an endoscope). Thus, example systems and methods may "receive . . . depth information" being data indicative of a relative depth, density, grating, location, frequency, and/or phase information of the structure within a 3-D coordinate space.

Diffraction grating, or grating, shall mean an optical component with a periodic structure that splits and diffracts light into several beams travelling in different directions. The directions of these beams depend on the spacing of the grating and the wavelength of the light so that the grating acts as the dispersive element. A grid pattern is an array of squares or rectangles of substantially equal size.

An endoscope having "a single optical path" through an endoscope shall mean that the endoscope is not a stereoscopic endoscope having two distinct optical paths separated by an interocular distance at the light collecting end of the endoscope. The fact that an endoscope has two or more optical members (e.g., glass rods, optical fibers) forming a single optical path shall not obviate the status as a single optical path.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to systems and methods of 3-D endoscopic imaging and measurement. The endoscopic imaging and measurement can be performed by a medical professional and/or be computer assisted.

Figure 1:
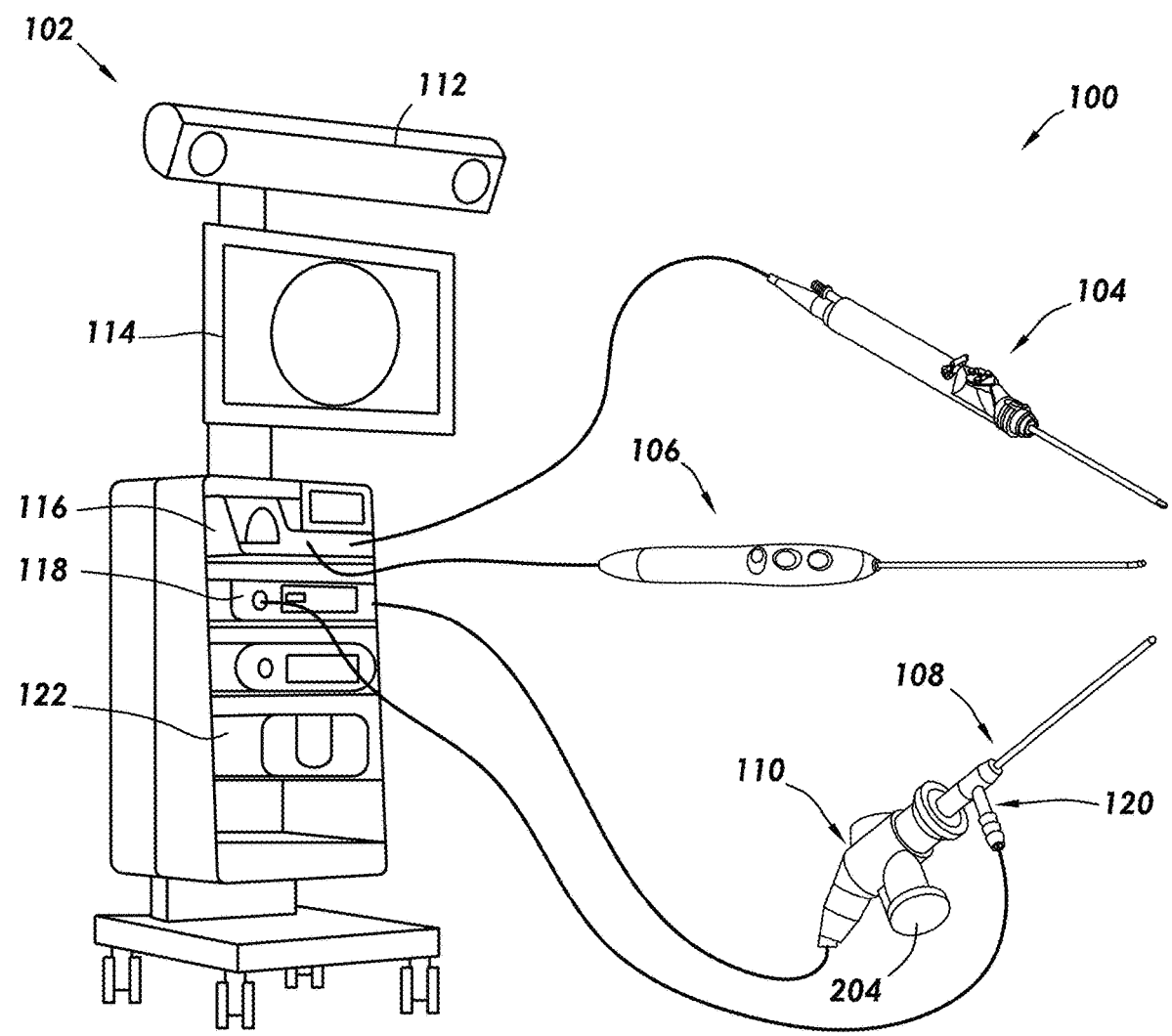
FIG. 1 shows a surgical system in accordance with at least some embodiments.

FIG. 1 shows a surgical system (not to scale) in accordance with at least some embodiments. In particular, the example surgical system 100 comprises a tower or device cart 102, an example mechanical resection instrument 104, an example plasma-based ablation instrument (hereafter just ablation instrument 106), and an endoscope 108 with an attached camera head 110, an integral light post 120, and an attached a depth measurement module 204. The device cart 102 may comprise a camera 112 (illustratively shown as a stereoscopic camera), a display device 114, a resection controller 116, and a camera control unit (CCU) together with an endoscopic light source (e.g., a first light source 220) and a video controller 118. In example cases, the CCU, endoscopic light source, and video controller 118 provide light through the light post 120 to the endoscope 108 to illuminate the surgical field, and display images received from the camera head 110. The CCU, endoscopic light source, and video controller 118 also implement various additional aspects, such as calibration of the endoscope 108 and the camera head 110, displaying planned-tunnel paths and images on the display device 114, receiving 2-D and 3-D images and grid patterns, calculating displacement of a focal point relative to a diffraction grating, adjusting a density of a diffraction grating to displace the focal point, and generating and displaying processed 3-D images. Thus, the CCU, endoscopic light source, and video controller is hereafter referred to as surgical controller 118. In other cases, however, the CCU and video controller may be a separate and distinct system from the controller that handles aspects of intraoperative changes, yet the separate devices would nevertheless be operationally coupled.

The example device cart 102 further includes a pump controller 122 (e.g., single or dual peristaltic pump). Fluidic connections of the mechanical resection instrument 104 and ablation instrument 106 are not shown so as not to unduly complicate the figure. Similarly, fluidic connections between the pump controller 122 and the patient are not shown so as not to unduly complicate the figure. In the example system, both the mechanical resection instrument 104 and the ablation instrument 106 are coupled to the resection controller 116 being a dual-function controller. In other cases, however, there may be a mechanical resection controller separate and distinct from an ablation controller. The example devices and controllers associated with the device cart 102 are merely examples, and other examples include vacuum pumps, patient-positioning systems, robotic arms holding various instruments, ultrasonic cutting devices and related controllers, patient-positioning controllers, and robotic surgical systems.

The systems and methods disclosed herein can be used for monocular 3-D vision through an endoscope. Specifically, the systems and methods can be used to obtain 3-D images and perform topographic measurements from endoscope images by employing the self-imaging effect and using a single-channel image-forming system. The depth measurement module 204 can be used to form self-images and provide depth information obtained from the contrast of the self-images and measurements taken of the spacing between the lines of the grid pattern. The systems and methods are configured to obtain information to generate a 3-D image of a surface of a structure, cavity, channel, and/or recess inside of a patient. For example, the system can perform topographic measurements from endoscopic images and use a self-imaging effect (e.g., Talbot effect) to generate 3-D images.

Figure 2:
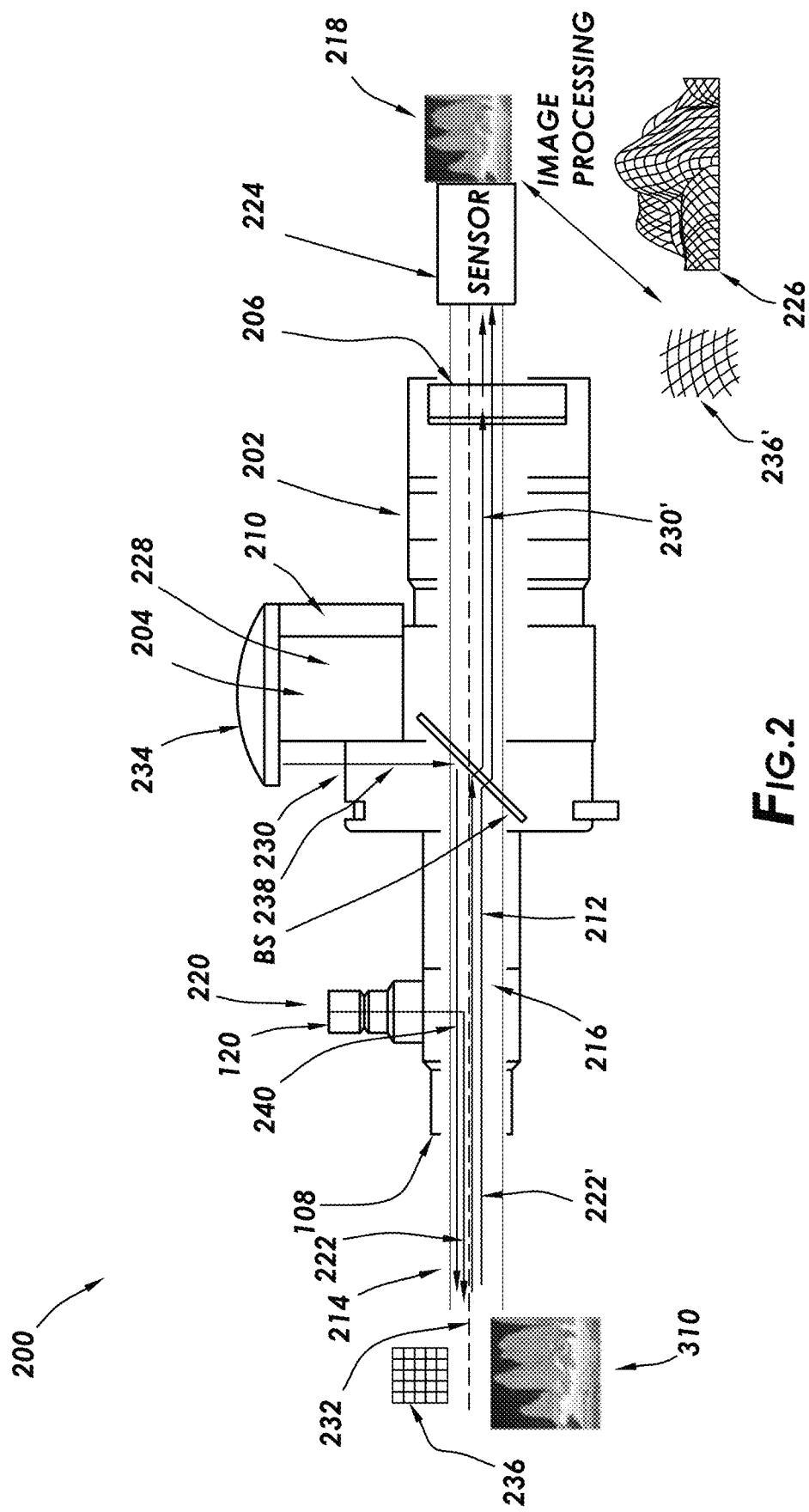
FIG. 2 shows a diagram of a system including an optical caliper in accordance with at least some embodiments.
Figure 3:
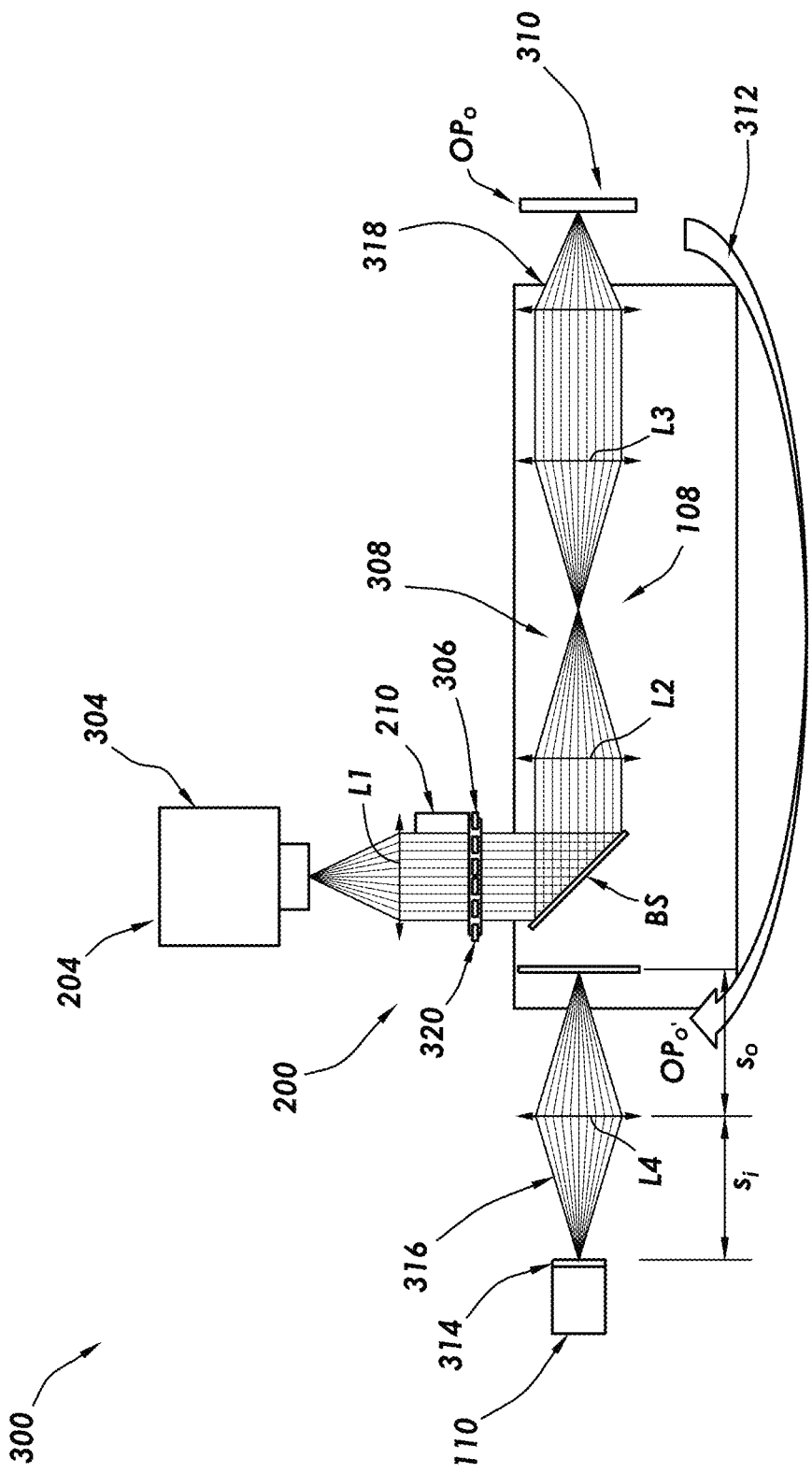
FIG. 3 shows a schematic diagram of the system in accordance with at least some embodiments.

FIG. 2 shows an example system 200 in accordance with at least some embodiments. FIG. 3 shows an example system 300, which includes a simplified schematic of the system 200 of FIG. 2, but rotated about a vertical axis. Referring simultaneously to FIGS. 2 and 3. The system 200 includes the endoscope 108 with its light port 120, the camera head 110, and the depth measurement module 204. The camera head 110 can be coupled at the proximal end of the endoscope 108. The camera head 110 can comprise a reflector 206, such as a dichroic reflector. The camera head 110 may comprise one or more image sensors 224. The one or more image sensors 224 may be a Red/Green/Blue (R/G/B) sensor, an ultraviolet (UV) sensor, an infrared (IR) sensor, a charge-could device (CCD) array, any other image sensor or combination thereof. The light port 120 may be defined by endoscope 108 near the proximal end of the endoscope 108. The light port 120 is configured to receive a first light ray 222 (e.g., visible light) from a first light source (such as the endoscopic light source within the surgical controller 118). The first light ray 222 may be visible or white light illumination, and the visible or white light reflected within the surgical site can be detected by an image sensor 224 (e.g., the R/G/B sensor, CCD array). The first light ray 222 travels within the endoscope 108 along a first illumination path disposed in an optical channel 216 along (e.g., parallel to) an optical axis 232, and emits out of the distal end of the endoscope 108 into the surgical cavity (e.g., knee, shoulder). After reflection from surfaces within the surgical cavity, the reflected first light ray 222' may propagate through one or more lenses (e.g., objective lenses L2 and L3) coupled associated with the endoscope 108 to arrive back at the camera head 110, and be captured by the image sensor 224.

The depth measurement module 204 can be coupled to the system 200 between the endoscope 108 and the camera head 110, or at any other suitable location. The depth measurement module 204 may comprise another light source (e.g., a second light source 228), an objective lens L1, a Liquid Crystal Display (LCD) 320, a microcontroller 210, and a prism (e.g., a beam splitter BS). The second light source 228, the beam splitter BS, the lens L1, the LCD 320, and the microcontroller 210 can be disposed in a housing 234.

The second light source 228 may be a laser, a tunable laser, or any other desired light source. The second light source 228 may light in the visible spectrum or outside the visible spectrum (e.g., infrared (IR) or ultraviolet (UV) lights), a coherent light that includes phase information, a coherent light that can generate a periodic pattern, any other desired light or combination thereof. The second light source 228 and LCD 320 may be used to create a grid pattern within the surgical site, and reflections of the grid pattern from within the surgical site may be used to obtain information from which depth can be decoded via image processing for recognizing distortion, periodic patterns, and/or phase information.

The lens L1 may be disposed in the housing 234 between the second light source 228 and the LCD 320. For example, the lens L1 may be positioned a distance from the second light source 228 equal to the focal length of the lens L1. In this example, the lens L1 can collimate the second light ray 230 as it transmits through the lens L1.

The LCD 320 can be disposed in the housing 234 between the lens L1 and the beam splitter BS. The microcontroller 210 can be operatively coupled to the LCD 320. The microcontroller 210 can be configured to display a grating 306 on the LCD 320 to generate grid patterns at one or more different periods. The microcontroller 210 can be configured to change the density of the grating and/or rotate the grating displayed on the LCD 320. The beam splitter BS can be disposed in the depth measurement module 204 at an angle, such as at a 45 degree angle from the second illumination path 240.

The depth measurement module 204 can be configured to transmit the second light ray 230 from the second light source 228 through the lens L1 and the grating 306 formed by the LCD 320 and toward the beam splitter BS, which reflects at least a portion of the second light ray 230 to within the endoscope 108 along a second illumination path and out of the distal end of the endoscope 108. The second light ray 230 may travel through one or more lens (e.g., lens L2 and lens L3). The depth measurement module 204 can be configured to transmit both the second light ray 230 (forming the structure lines of the grid pattern 236) into the surgical space containing the object 310 (e.g., into a portion of a patient's knee or any other desired body part). A portion of the second light ray 230 is reflected (e.g., reflected second light ray 230'). The reflected second light ray 230' (e.g., a reflected distorted grid pattern 236') travel through a second optical path 214 (e.g., a second image path) of the endoscope 108. The reflected second light ray 230' and the distorted grid pattern 236' travel back through the lenses L3 and L2, the beam splitter BS, an objective lens L4 (e.g., being part of an eyepiece 316), and to the camera head 110. The beam splitter BS can be configured to reflect diffracted light and form a self-image of the grating on a plane (e.g., an $OP_0$ plane shown in FIG. 3). The image sensor 224 can capture the distorted grid pattern 236'. If the second light ray 230 is in the visible spectrum, the image sensor 224 can capture the reflected second light ray 230'. If the second light ray 230 is outside the visible spectrum, a second image sensor (e.g., a specialty sensor) capable of such detection can be used capture the reflected second light ray 230'. The second image sensor can be coupled and/or be part of the camera head 110.

The image sensor 224 can be configured to receive a first set of images 218. The first set of images 218 may pertain to the first light ray 222. The image sensor 224 can be configured to receive a second set of images 226. The second set of images 226 may pertain to the reflected second light ray 230' comprising the reflected grid pattern 236'. The system 200 further comprises a processing device 2002 (FIG. 20) communicatively coupled to the system 200. As described in more detail herein, the processing device 2002 can be configured to receive and use the first and second sets of images 218 and 226 (including the grid pattern 236') from the image sensor 224 to generate one or more 3-D images.

In example systems and methods, the two optical paths 212, 214 are the same optical channel 216. The first optical path 212 may be configured for regular imaging and for receiving 2-D planar images 218. The second optical path may be configured for 3-D imaging and receiving 3-D images 226 and grid patterns 236'. Thus, in one example the first illumination path, along with the first light ray 222 travels, is a separate and distinct optical path than the optical channel 216. Note, however, that in some examples the second light ray 230 propagates to the surgical site along the optical channel 216, which optical channel 216 also carries the reflected first light ray 222' and the reflected second light ray 230'. In other embodiments, the first optical path 212 is configured for depth imaging and the second optical path 214 is configured for regular imaging.

The processing device 2002 can measure the depth of a surface of an object using depth information obtained from the second optical path 214 (e.g., the depth measurement path). The processing device 2002 can receive the depth information from the second optical path 214 without interfering with any of the first set of images 218 (e.g., images created from the reflected visible light) from the first optical path 212. The second illumination path may include two sections: a first section 238 and a second section 240. The first section 238 may be perpendicular to the second section 240. The second section 240 of the second illumination path and the first illumination path may be disposed in the same optical channel 216.

In some embodiments, the system 200 uses the Talbot effect for self-imaging to obtain the depth measurement. The microcontroller 210 is configured to generate grid patterns or gratings at different periods (e.g., densities) by way of the LCD 320. Software run on the microcontroller is configured to transmit instructions to rotate the grid patterns or gratings by way of the LCD 320. The microcontroller 210 can control diffraction grating in the camera head 110. For example, the microcontroller can be configured to sweep the object for depth information and form lines at certain locations, for example, based on the density of the grid patterns 236.

In some examples, the system 200 includes a glass for displaying a fixed diffraction grating. In this example, the microcontroller 210 can control a tunable laser (e.g., the second light source 228) to receive the depth information. The microcontroller 210 can control the tunable laser by varying the wavelength emitted. Alternatively, an interchangeably fixed diffraction grating could be used and rotated. In other examples, a micro-mirror array can be used to change a density or a light phase of the grating. The processing device 2002 can use the information obtained by the changes to generate 3-D images with higher resolution.

Regardless of precisely how created, the diffraction grating can be used to generate a grid pattern 236 via its different orders of self-imaging (e.g., a Talbot carpet). The Talbot carpet can be generated via various types of diffraction of grating. The Talbot effect with generating self-imaging of the diffraction grating can function as a 3-D profilometer. In some examples, the first light ray 222 is a visible light detected by a visible light sensor 224 (e.g., an R/G/B sensor) and the second light ray 230 is an infrared or an ultraviolet and the microcontroller 210 generates structure lighting lines (e.g., the grid pattern 236). The grid pattern 236 is sent though the second illumination path 240 to the surgical site (e.g., the object 310). The grid pattern 236 is reflected (at different depths within the surgical site) to create a distorted grid pattern 236' detected by imaging sensor 224. The processing device 2002 may create the 3-D image 226 by combining the 2-D image 218 and the distorted grid pattern 236'.

In some examples, the second image sensor is configured to detect the structured lighting lines (e.g., the grid pattern 236'). For example, the second image sensor may be an infrared sensor, an ultraviolet sensor, or any other desired sensor. The second light ray 230 can be a light outside the visual spectrum, and therefore, does not interfere with the first light ray 222 in the visible spectrum. The processing device 2002 can use the reflected second light ray 230' to generate an image using grid patterns 236' not in the visible spectrum. In some examples, the system 200 is configured to analyze phase information for phase information decoding, periodic patterns, and/or any other desired image information. In some examples, the system 200 uses a micro-mirror array for generating lines (e.g., a grid pattern 236) for depth information decoding.

Using one or more of the methods disclosed herein, the processing device 2002 can process the received images to correct image distortion and decode the depth information via calculation to generate 3-D images 226. The processing device 2002 can determine, using the spacing (e.g., measurements of distance between lines of the grid pattern 246), the depth and 3-D imaging. If an area of the image is blurred (e.g., has a low resolution), the processing device 2002 can refocus the image. The processing device 2002 can measure the period of the grating and the contrast to obtain additional information (e.g., depth information) on the position of the object. The processing device 2002 can focus the grid lines on an area and analyze the contrast and/or density to provide an image with a higher resolution. The contrast lines can correlate to a specific depth of the object. The system 200 can be configured to autofocus while sweeping the object to obtain depth information. For example, in an autofocus mode, the processing device 2002 can use phase information (e.g., the phase of the outgoing refraction light) to automatically focus. The processing device 2002 use the phase information to facilitate focus and/or to generate images with additional resolution. The microcontroller 210 can generate the grid patterns 236 and, using the software, vary the grating of the grid patterns 236. For example, the microcontroller 210 can change the density of the grating displayed on the LCD 320 and/or rotate the grating on the LCD 320 about the optical axis 232 of the endoscope 108, or otherwise change the grating to capture additional image information to generate the 3-D images. The resulting scan can include a full depth of the object and additional image information. For image processing, the system 200 can be integrated with the surgical controller 118 using the board integrated with the system 100.

Some examples pertain to using an artificial intelligence engine and/or machine learning engine to generate images. For example, the processing device 2002 can be configured to generate, via an artificial intelligence engine, a machine learning model trained to generate image data based on at least one of the first and second sets of images 218, 226. The artificial intelligence engine and/or machine learning engine may be trained to change the density of the grating displayed on the LCD 320 and/or rotate the grating on the LCD 320 about the optical axis of the endoscope 108, or otherwise change the grating to capture additional depth image information to generate the 3-D images. The artificial intelligence engine and/or machine learning engine can adjust the optical system based on new learnings generated from analysis of the depth information. For example, the artificial intelligence engine and/or machine learning engine may analyze, using gratings of different spatial frequencies, the behavior of the self-images formed by the optical components of the endoscope 108. The artificial intelligence engine and/or machine learning engine may vary the distance between the grating and the focal point to obtain additional depth information, such as the density of the grating of the object, by analyzing the lines of the grid on the object. The methods and systems disclosed herein reduce the need for an additional cameral and/or an additional optical channel to obtain such information. The artificial intelligence engine and/or machine learning engine can analyze the formation of the self-images on both a flat object and a curved surface. The system 200 or any other systems or methods described herein may be used in robotics-aided medical procedures.

FIGS. 2 and 3 are not intended to be limiting: the systems 200, 300 may include more or fewer components than those illustrated.

Images on a Flat Surface

As illustrated in FIGS. 2-9B, the systems and methods can be used to measure distances between objects with flat surfaces. The depth measurement module 204 can be configured to use a diode laser 304 emitting in the visible region of the electromagnetic spectrum (e.g., $\lambda$=634.9 nm) to illuminate a grating 306 with a collimated wavefront, using the lens L1, on the LCD 320. The depth measurement module 204 uses the beam splitter, BS, to direct light and form a self-image of the grating 306 (e.g., the grid pattern 236) on an $OP_0$ plane. Optical relays of the endoscope 108 (e.g., of lenses L2 and L3) are illustrated in an area 308, each of which can be disposed at opposite ends of the endoscope 108. An objective lens 318 can be positioned adjacent to the $OP_0$ plane or any other desired location. The $OP_0$ plane represents an area of an object 310, such as a knee of a patient that is undergoing a medical procedure (e.g., using the endoscope 108). As illustrated by the arrow 312, the endoscope 108 can be configured to form an image of the $OP_0$ plane on the $OP'_0$ plane.

The eyepiece 316 can be disposed at the proximal end of the endoscope 108 and coupled to the camera head 110. The eyepiece 316 includes the lens L4. The lens L4 can be disposed a distance Si from an image sensor, shows as CCD 314 in FIG. 3. The CCD 314 may be a member of the camera head 110. The lens L4 can be disposed a distance $S_0$ from the $OP'_0$ plane. The lens L4 can be configured to form the image of the $OP'_0$ plane on the CCD 314. The CCD 314 can be an integrated circuit etched onto a silicon surface forming light sensitive elements (e.g. pixels). Photons striking on this surface can generate charge that can be read by the processing device 2002 and turned into a digital copy of the light patterns falling on the CCD 314. Thus, the $OP_0$ plane can be reflected in the $OP'_0$ output plane.

Figure 4A:
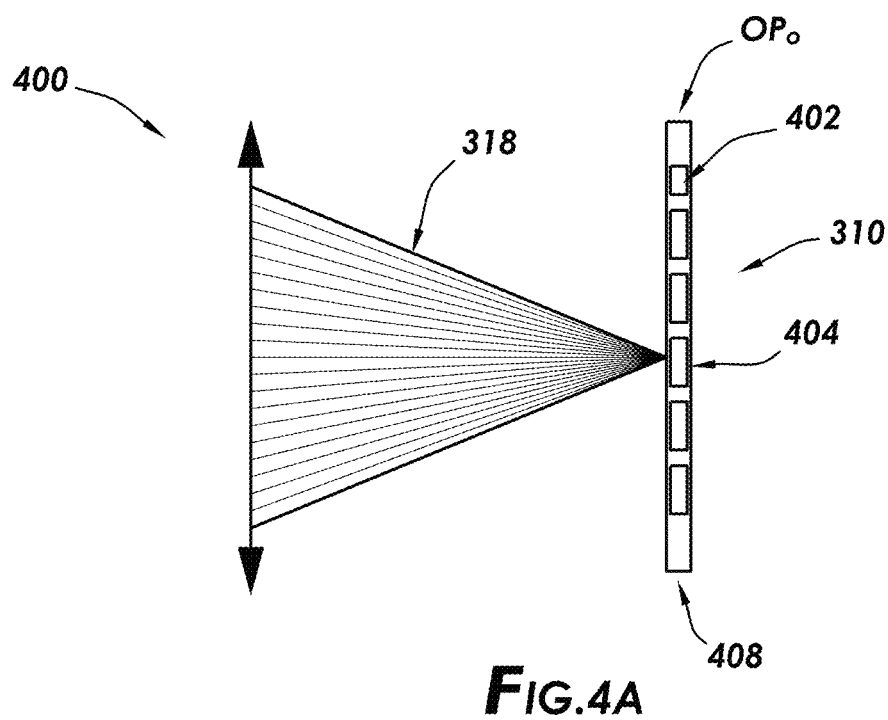
FIGS. 4A and 4B show schematics of a first grating at different focal points, respectively, in accordance with at least some embodiments.

FIG. 4A shows a configuration 400 of the objective lens 318 relative to a first focal point 404. In this example, the processing device 2002 uses a first grating with a frequency of 98 lines/inch to generate a self-image 402 formed on the $OP_0$ plane (e.g., the self-image plane 408 aligns with the $OP_0$ plane, as shown by equation $\Delta Z$=0 mm).

Figure 4B:
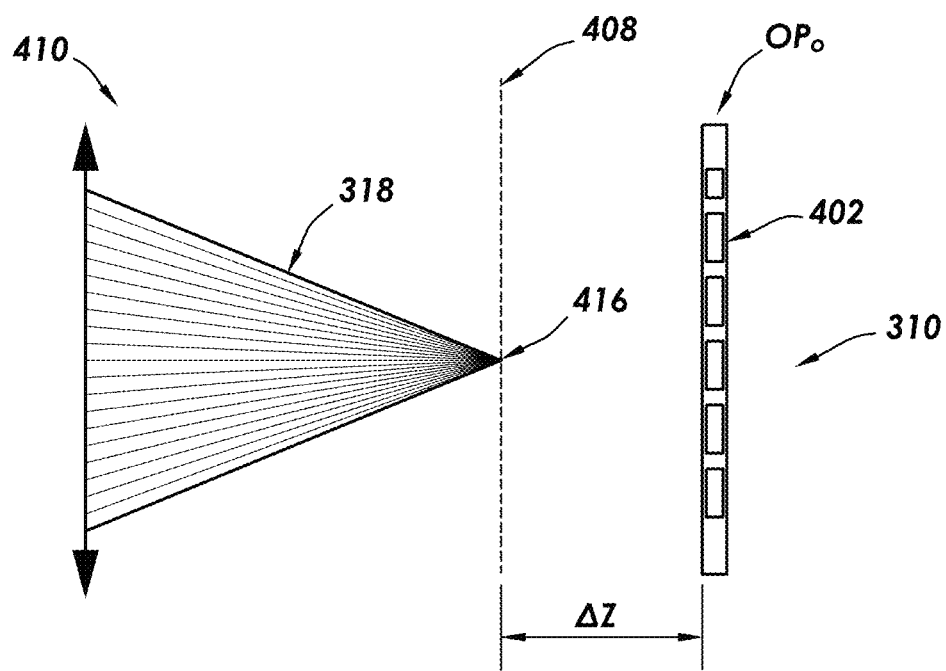
Figure 5A:
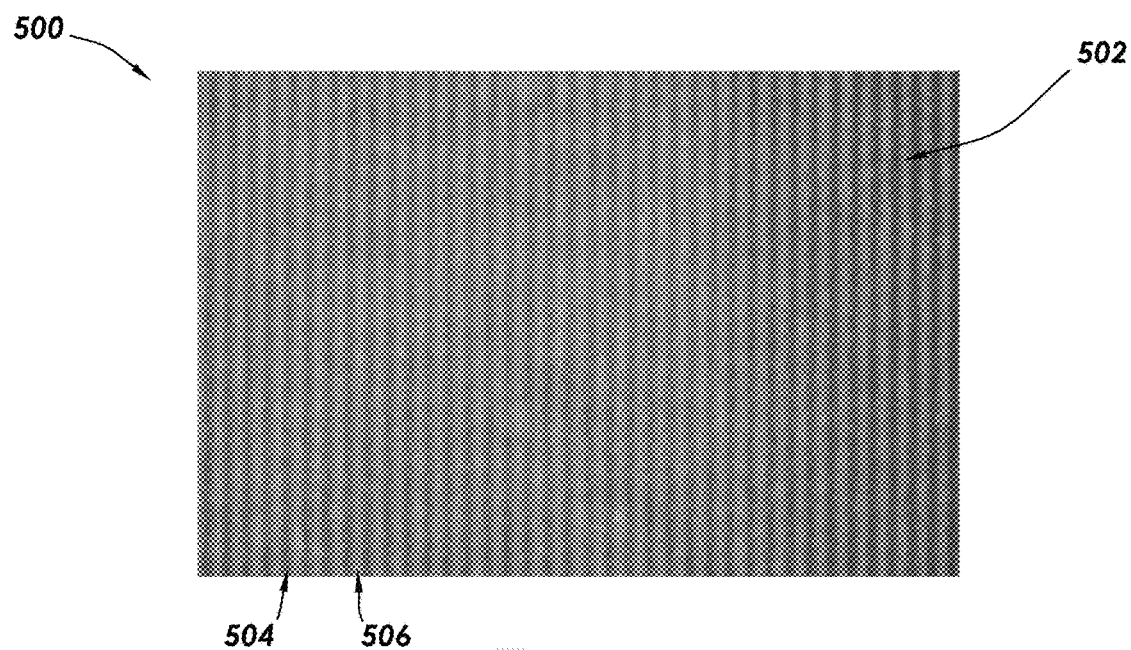
FIG. 5A shows an image formed using the configuration of FIG. 4A
Figure 5B:
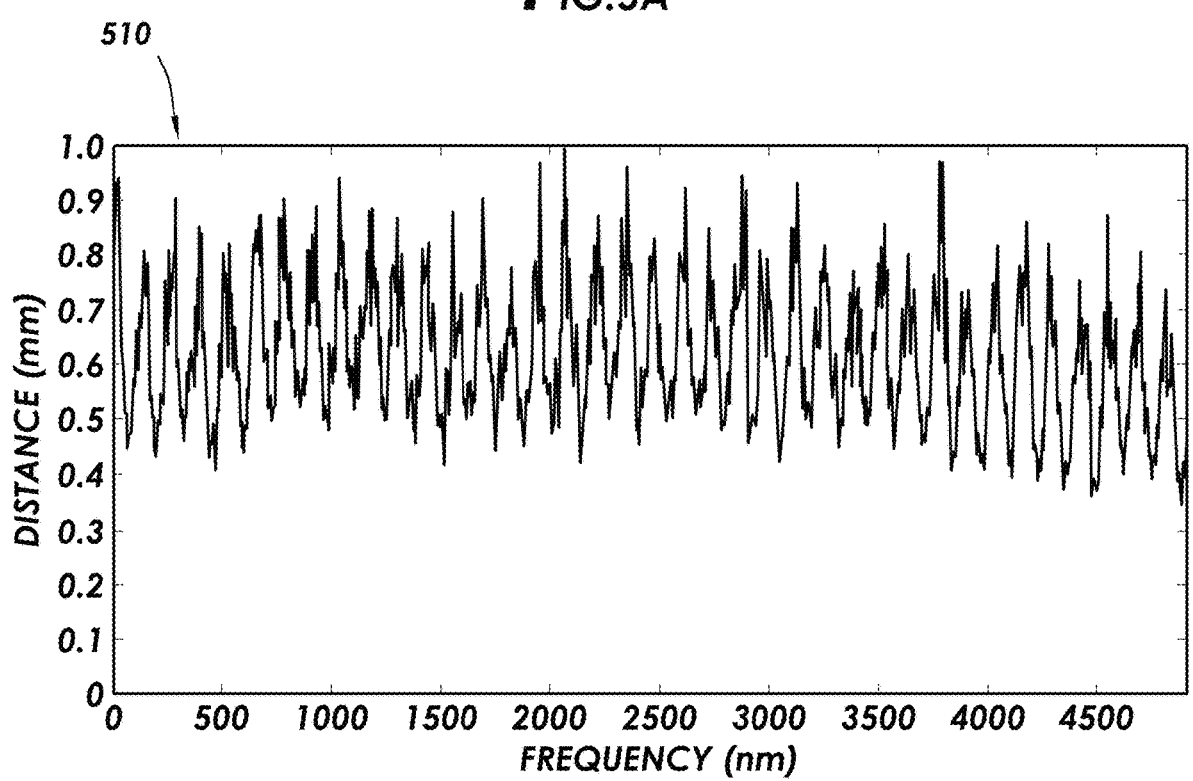
FIG. 5B shows a graph of a profile measured in a middle portion of the image in accordance with at least some embodiments.

FIG. 5A shows an image 500 generated of an object 310 using the configuration 400 (FIG. 4). The image 500 includes alternating dark and light vertical lines 504, 506. The contrast of the vertical lines represents the different depths of the surface of a portion of the object 310 being imaged. The fringes 502 of the image 500 are of high contrast (e.g., include a range of bright highlights to dark shadows). The high contrast shows that the image 500 is a self-image. FIG. 5B shows a graph 510 of the profile measured in a middle portion of the image 500. As shown by the graph 510, the frequency of the profile measured changes as the contrast of the image 500 changes.

To determine whether the image 500 is a self-image, the processing device 2002 can move the first focal point 404 to a second focal point 416, as shown in FIG. 4B. The second focal point 416 may be a distance of several millimeters, less than one millimeter, or any other desired distance from (e.g., in front of) the plane $OP_0$, and the change in location of the focal point is represented schematically by $\Delta Z$ in a configuration 410.

Figure 6A:
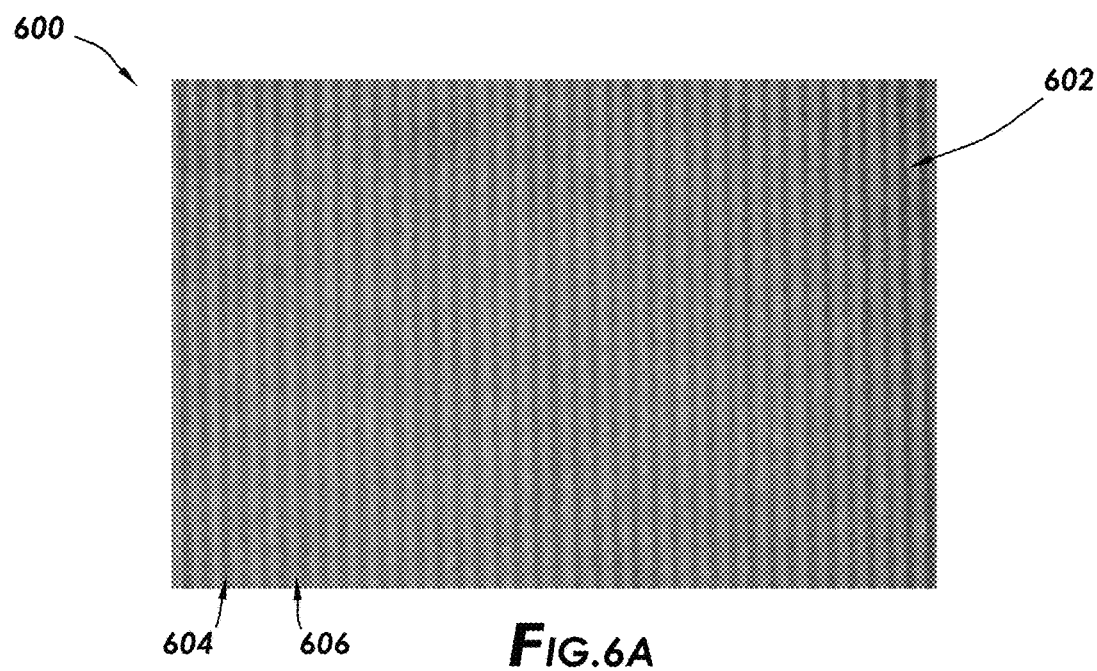
FIGS. 6A and 6C show images of gratings formed at different focal points of FIG. 4B and FIGS. 6B and 6D show graphs of the profiles measured at the different focal points.
Figure 6B:
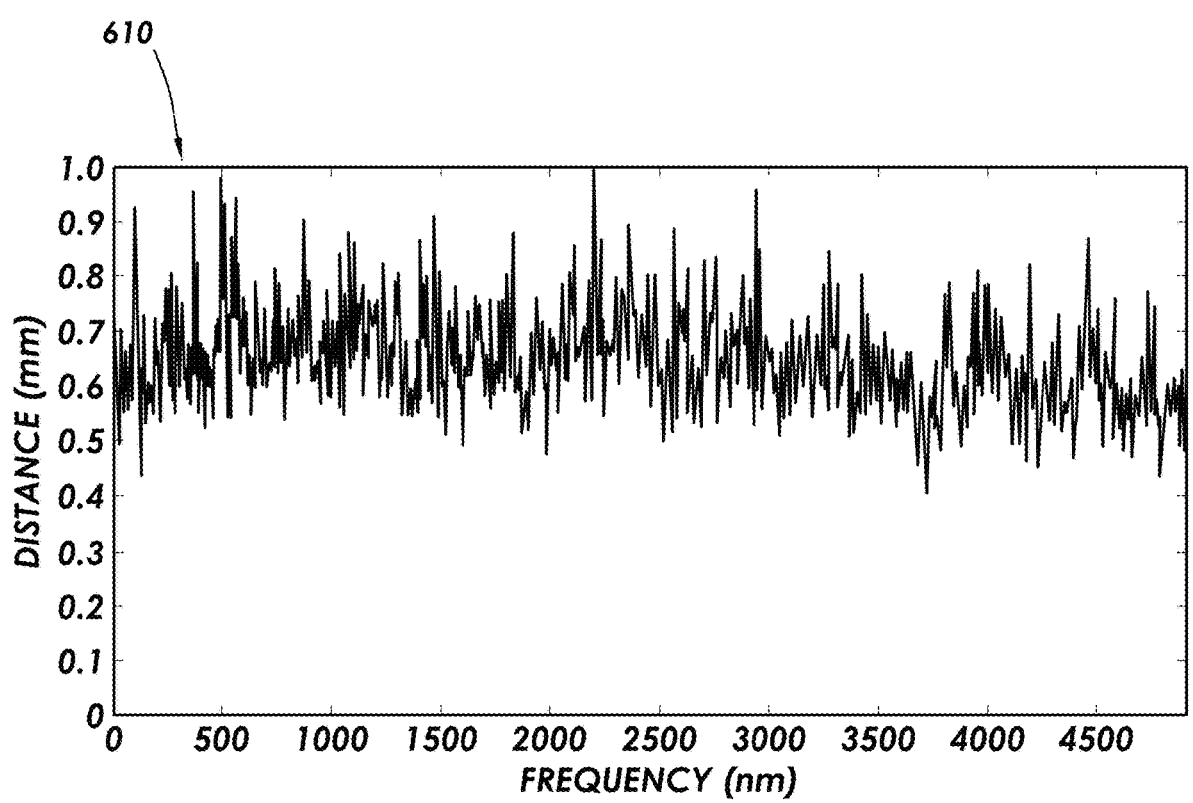
Figure 6C:
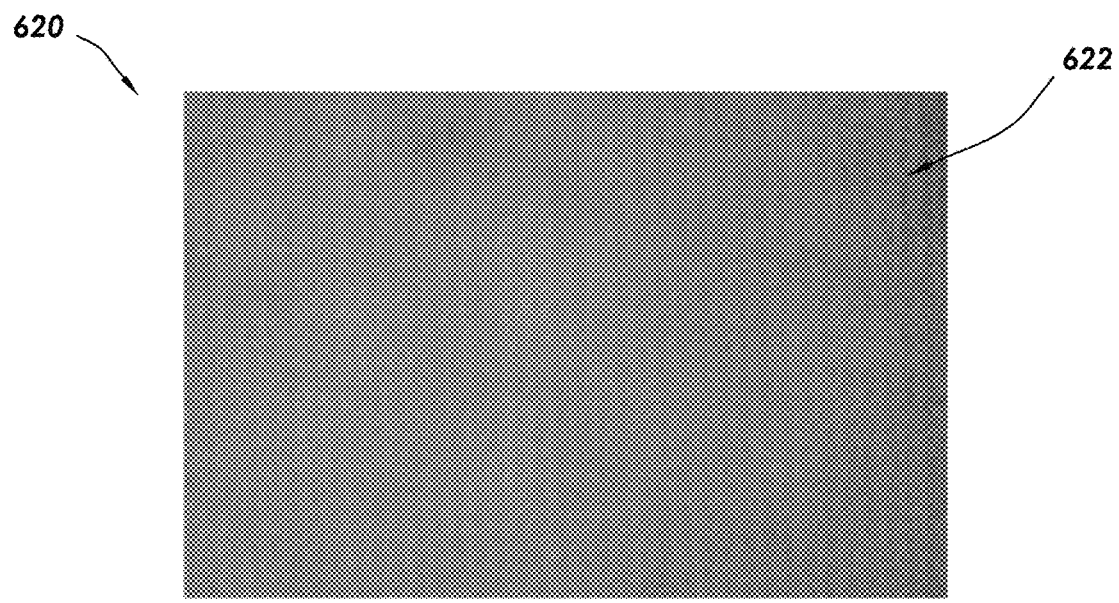
Figure 6D:
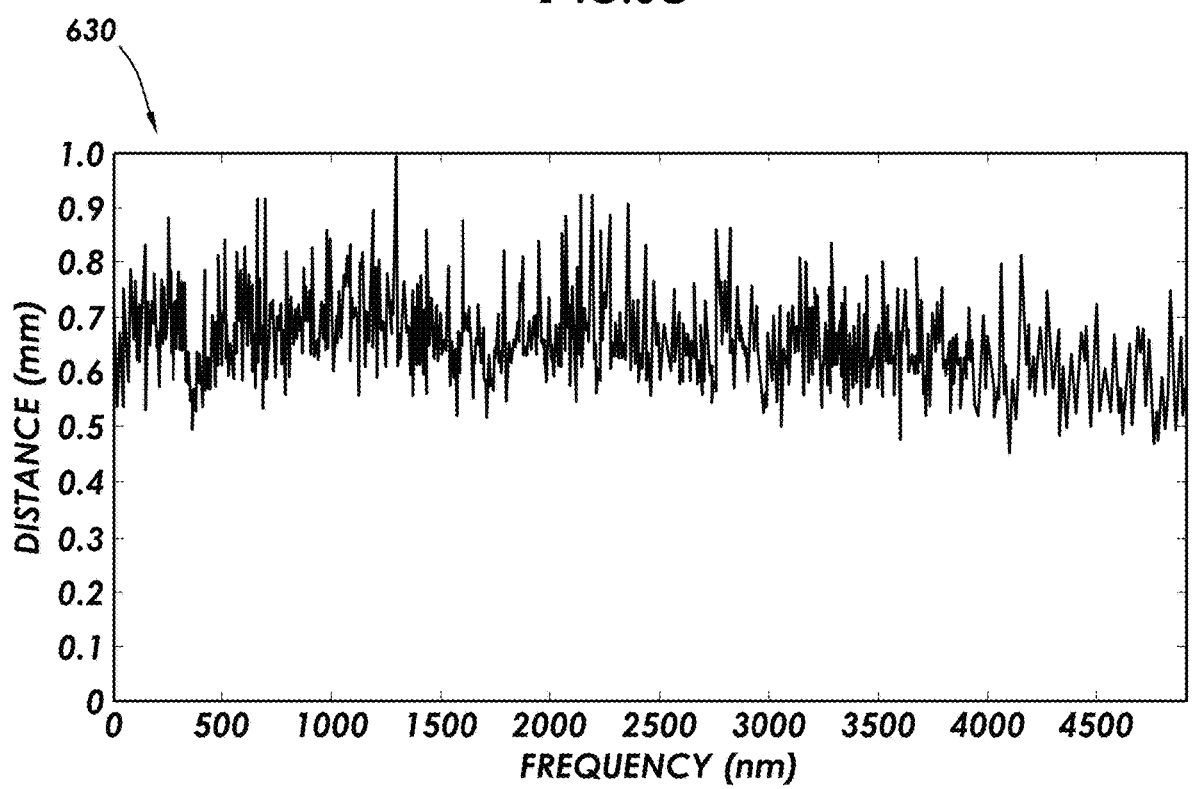

In comparison to the image 500 with the self-image plane 408, which includes the focal point 404, aligning with $OP_0$ plane ($\Delta Z$=0 mm), FIGS. 6A-B show an image 600 and a resulting graph 610 for a configuration 410 having a distance of $\Delta Z$=−5 mm between the self-image plane 408 and the $OP_0$ plane and FIGS. 6C-D show an image 620 and a resulting graph 630 for a configuration 410 having a distance of $\Delta Z$=−10 mm between the self-image plane 408 and the $OP_0$ plane. As the distance of the focal point 416 from the $OP_0$ plane increases, the contrast of the fringes 602, 622 decrease. For example, as the distance of the focal point 416 from the $OP_0$ plane increases from $\Delta Z$=0 mm (image 500) to $\Delta Z$=−5 mm (image 600) to $\Delta Z$=−10 mm (image 620), the contrast decreases from the fringes 502 to the fringes 602 to the fringes 622. Furthermore, the contrast of lines 604 and 606 has decreased from lines 504, 506 (FIG. 5A). As contrast decreases, less depth information can be obtained from the images. As shown by the graphs 410, 610, and 630, the frequency of the profiles measured change as the contrast of the images change.

The processing device 2002 can change the grating density. As shown by a configuration 700 in FIG. 7A, the processing device 2002 can refocus the objective lens 318 on the $OP_0$ plane (e.g., represented by the convergent triangle with a vertex 704 in the $OP_0$ plane). The object 312 is observed on the $OP_0$ plane and a second grating of 100 lines/inch is used, resulting in a self-image 702 being formed a distance ($\Delta Z$) from the $OP_0$ plane (e.g., the self-image plane 708 does not align with the $OP_0$ plane).

Figure 7A:
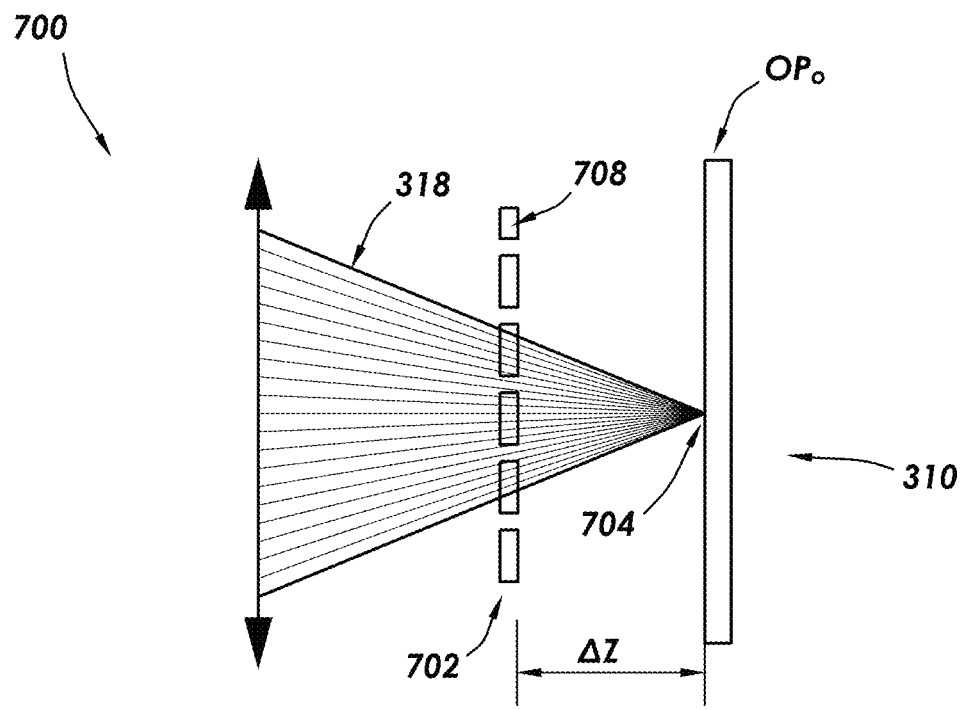
FIGS. 7A and 7B show schematics of a second grating in accordance with at least some embodiments.
Figure 8A:
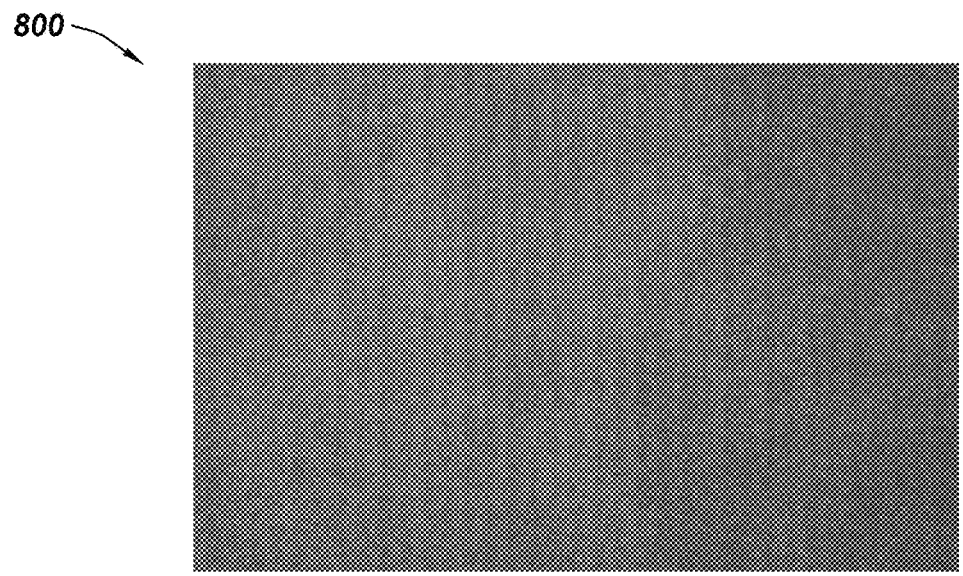
FIG. 8A shows an image of the second grating of FIG. 7A that is formed in the plane of observation and FIG. 8B shows a graph of the profile measured in a middle portion of the image in accordance with at least some embodiments.
Figure 8B:
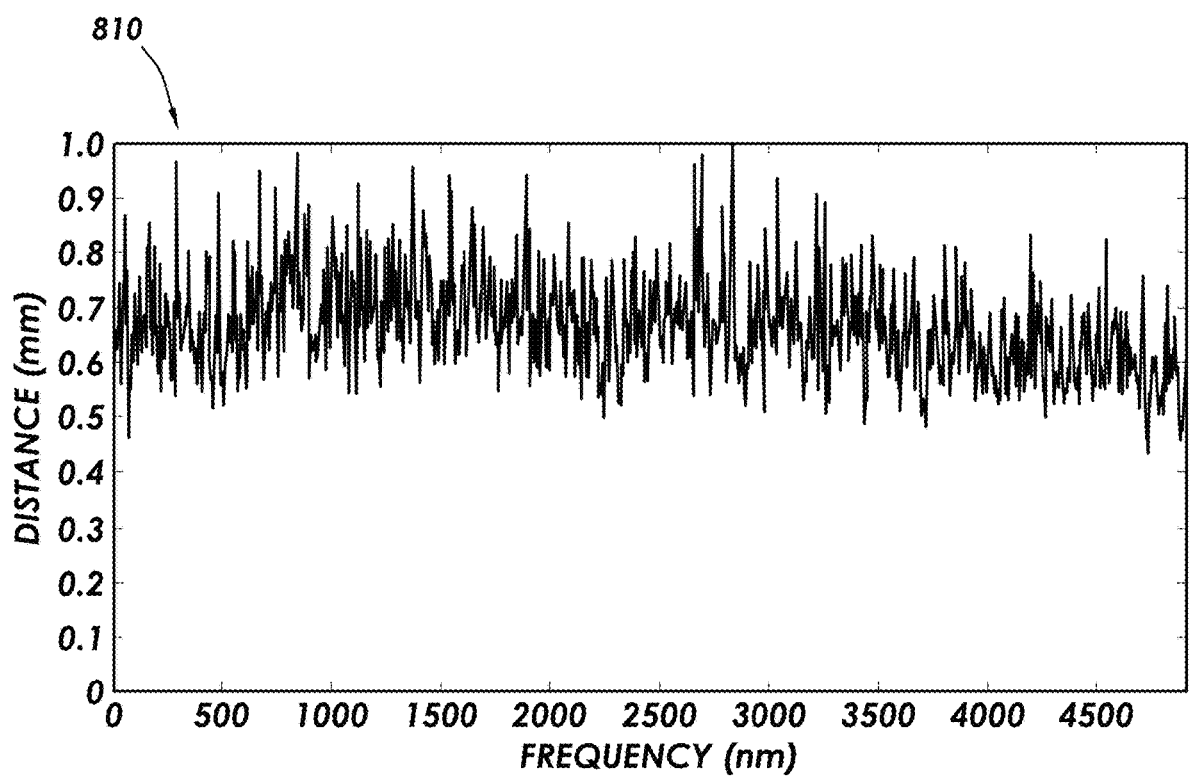

FIG. 8A shows the image 800 generated of the object 310 using configuration 700 (FIG. 7A). Because the self-image is not formed on the $OP_0$ plane, the image of the grating is not in high contrast. The image 800 does not have alternating dark and light vertical lines. FIG. 8B shows the graph 810 of the profile measured in a middle portion of the image. As shown by the graph 810, the frequency of the profile measured changes as the contrast of the image changes.

Figure 7B:
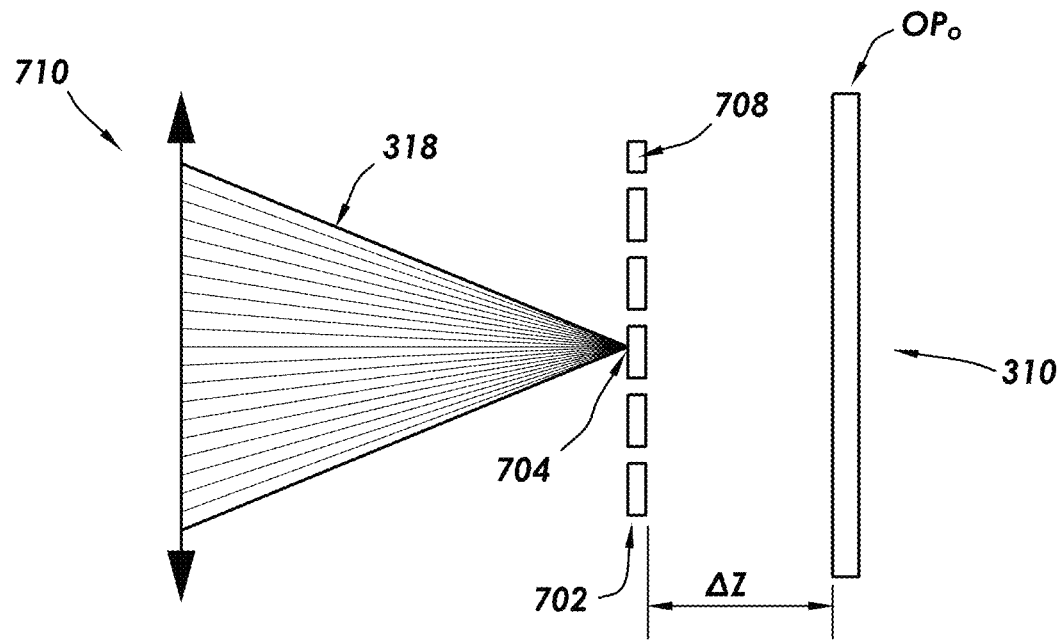
Figure 9A:
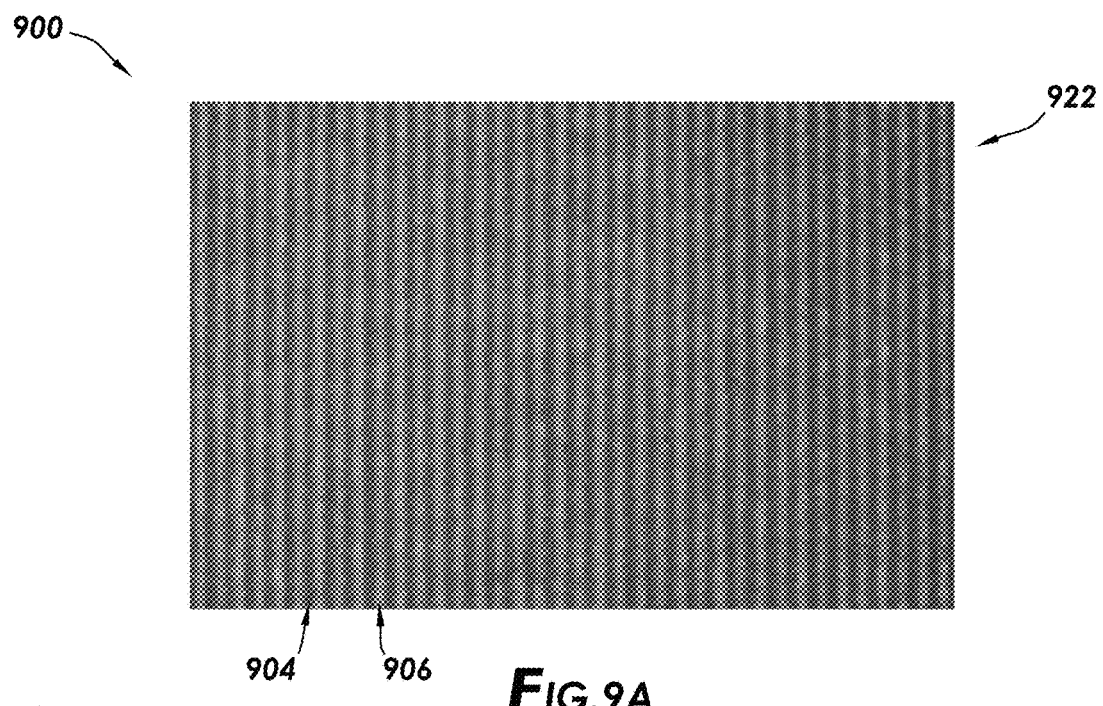
FIG. 9A shows an image of the second grating of FIG. 7B that is formed a distance from the plane of observation and FIG. 9B shows a graph of the profile measured in a middle portion of the image in accordance with at least some embodiments.
Figure 9B:
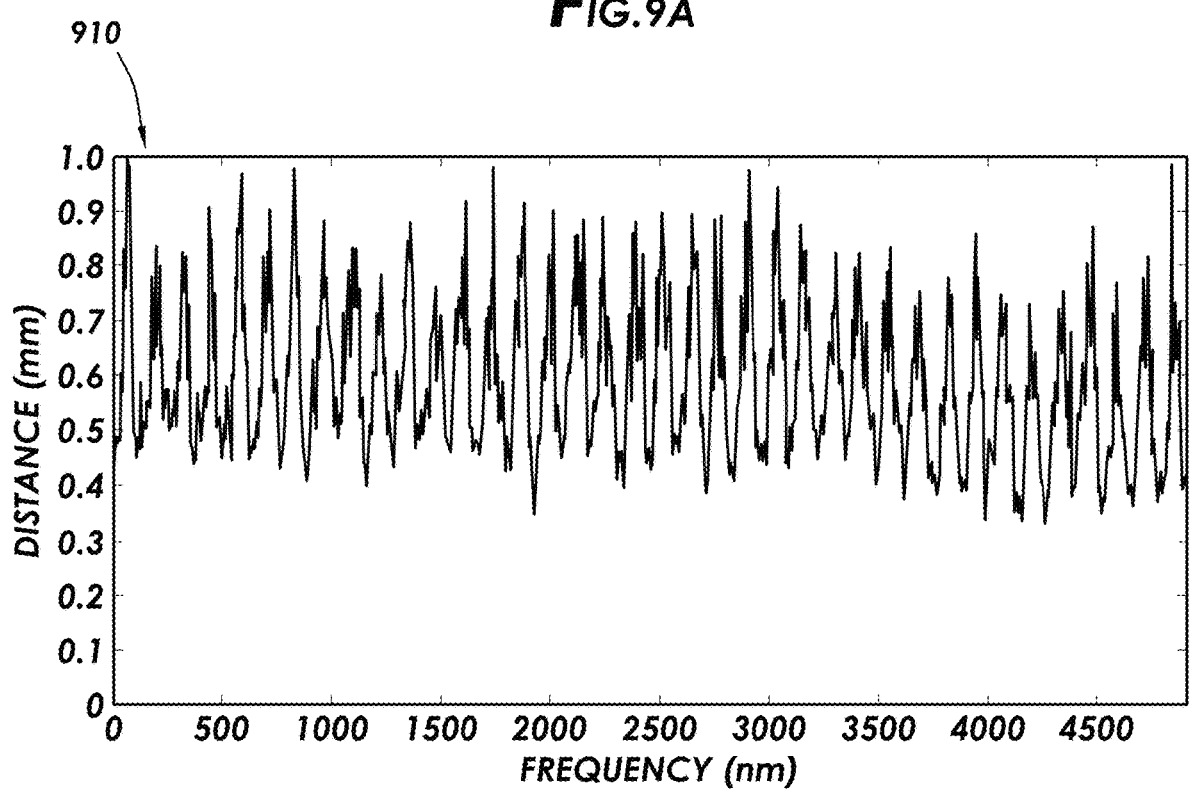

To improve the contrast, the processing device 2002 can move the vertex of the objective lens 318. FIG. 7B shows a configuration 710 with a vertex 704 a distance $\Delta Z$ from the plane of observation (e.g., the $OP_0$ plane). When the frequency changes (e.g., the density of the grating), the self-image may be formed at a distance $\Delta Z$ from the plane of observation. The focal point of vertex 704 can be moved to a self-image plane 708, both of which are positioned a distance $\Delta Z$ from the $OP_0$ plane. The self-image plane 708 and the vertex 704 do not match the $OP_0$ plane. The resulting image 900 is shown in FIG. 9A. The image 900 includes alternating dark and light vertical lines 904, 906. The contrast of the vertical lines represents the different depths of the surface of a portion of the object 310 being imaged. The fringes 902 of the image 900 are of high contrast (e.g., include a range of bright highlights to dark shadows). FIG. 9B shows the graph 910 of the profile measured in a middle portion of the image 900. As shown by the graph 910, the frequency of the profile measured changes as the contrast of the image 900 changes.

Using the period of the fringes and the wavelength of the incident radiation, the system 300 can determine the ΔZ displacement. The system 300, via the processing device 2002, can determine the ΔZ displacement by using equation 1:

$$\Delta Z = Z_{T(98)} - Z_{T(100)} = \frac{2(d_{98})^2}{\lambda} - \frac{2(d_{100})^2}{\lambda} \quad (1)$$

Equation 1 calculates the net displacement ΔZ of the self-image plane relative to the focal point (e.g., a focal plane). The displacement ΔZ is equivalent to the axial distance over two positions on a surface (e.g., at the fringes) of the first and second gratings (e.g., the Talbot lengths with respect to the grating periods), which is also equivalent to the difference of 2 times the square of the slit separation (e.g., the density of the grating (lines/inch)) of the first grating divided by the wavelength of the incident radiation (λ) and 2 times the square of the slit separation of the second grating divided by the wavelength of the incident radiation (λ).

For example, using equation 1, the resultant value of ΔZ in the configuration 710 is approximately 9 mm. The resultant value may be a greater or lesser displacement value. The examples provided herein are for illustrative purposes and can be modified in accordance with embodiments of this disclosure.

Images on a Concave Surface

Figure 10:
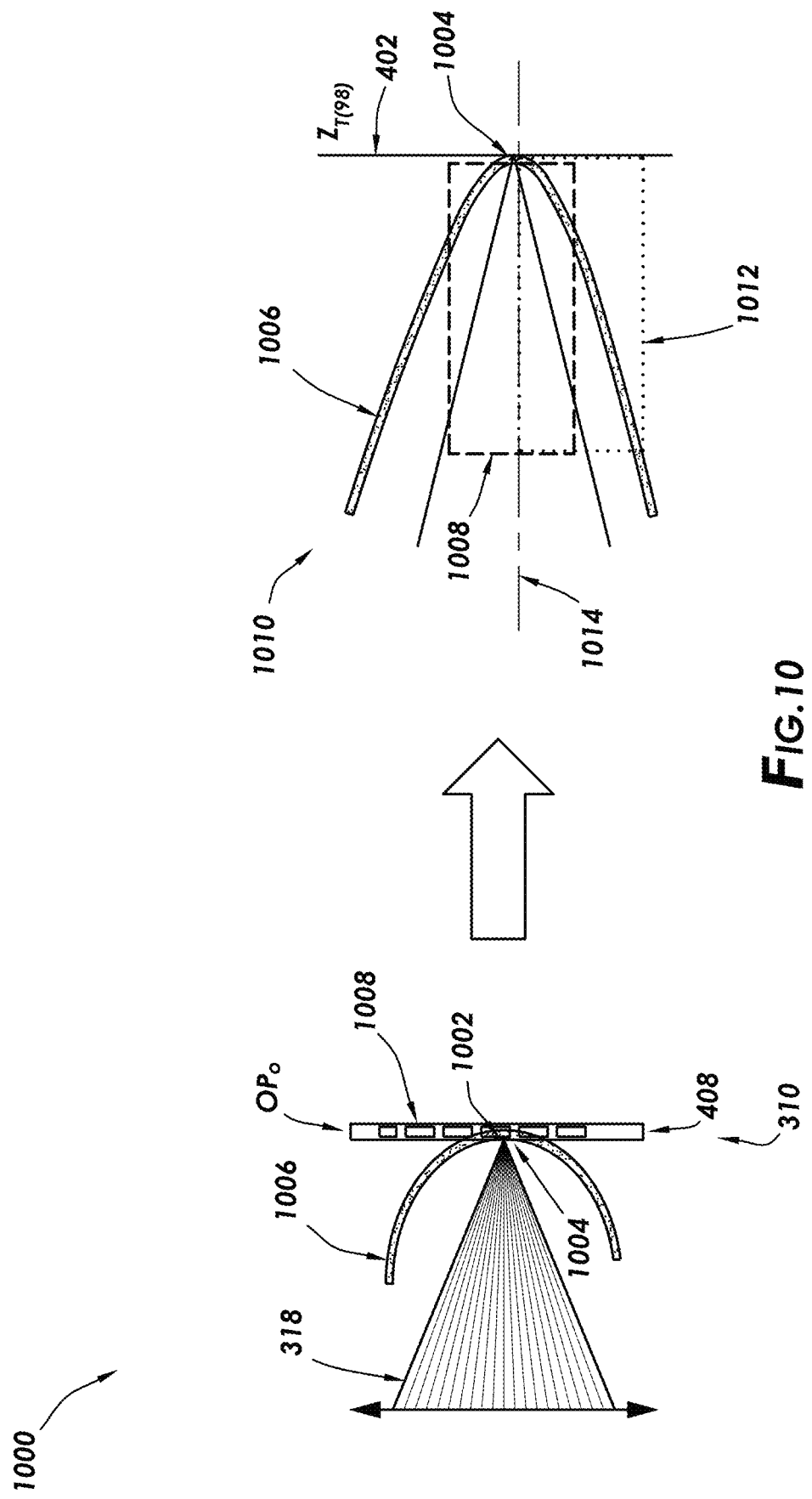
FIG. 10 shows a schematic of the first grating of FIG. 5A and a graph of the profiles measured in accordance with at least some embodiments.

As illustrated in FIGS. 10-19, the systems and methods can be used to measure distances between portions of objects with curved surfaces. The systems and methods of this disclosure can be used to distinguish and measure distances in images between objects, such as objects 310 inside a patient's knee or any other desired body parts that are not flat. Such images include a surface with some curvature. The systems and methods herein can be used to determine changes of a self-image 1008. FIG. 10 shows a configuration 1000 with the objective lens 318 having a focal point 1002 to form a self-image in a curved surface 1006 (e.g., a concave surface). The curved surface 1006 may be formed in a shape comparable to the shape of an eggshell (e.g., a prolate spheroid) or any other desired curved shape. A graph 1010 shows a position of the self-image 1008 with the vertex 1004 of the curved surface 1006 converging at the focal point 1002. In this embodiment, the first grating 402 comprises a frequency of 98 lines/inch.

The processing device 2002 can be configured to detect variation in curvature of the object 310 in a first zone 1008, as shown by the upper rectangle. A low variation in curvature may result in a reduced variations of contrast of the self-image 1008. If the processing device 2020 detects a low variation in curvature, the processing device 2020 can adjust the focal point (e.g., at vertex 1004) to move out of the first zone 1008 to a second zone 1012, as shown by the lower rectangle. In the second zone 1012, the detection area is moved to below the axis 1014 (which, in this example, corresponds with the apex); as shown schematically in graph 1010.

When the system 300 captures an image for a flat surface, the image can have similar results as the image captured at the axis 1014. The results, therefore are shown in FIGS. 4A and 4B. However, for a curved (e.g., concave) surface, the system 300 may be configured to detect additional information and produce images with different results.

Figure 11A:
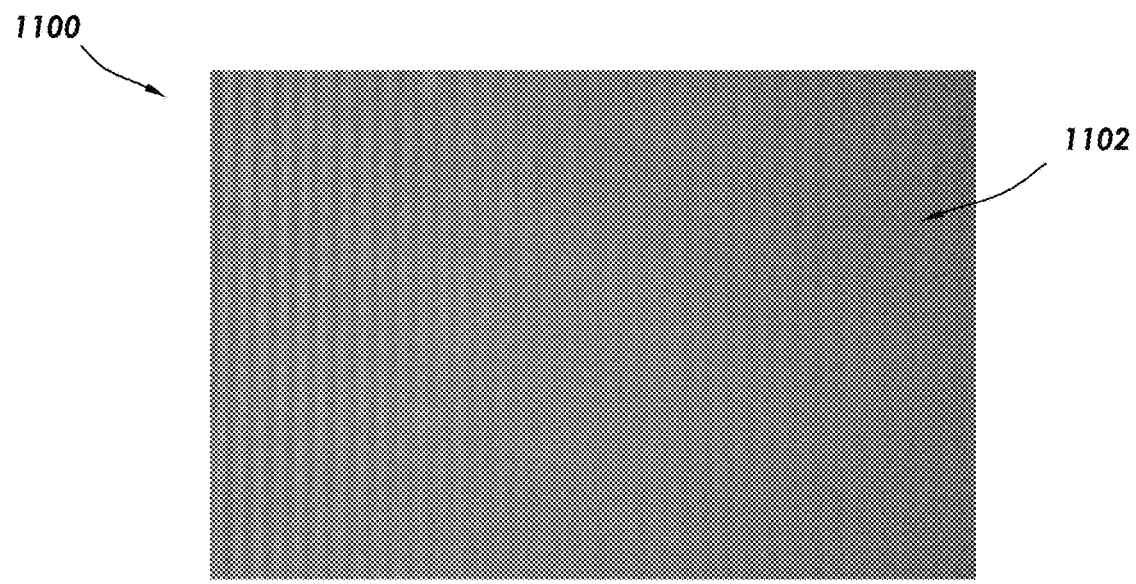
FIG. 11A shows an image of the first grating that is formed from observing a curved surface below the axis and FIG. 11B shows a graph of the profile measured in a middle portion of the image in accordance with at least some embodiments.
Figure 11B:
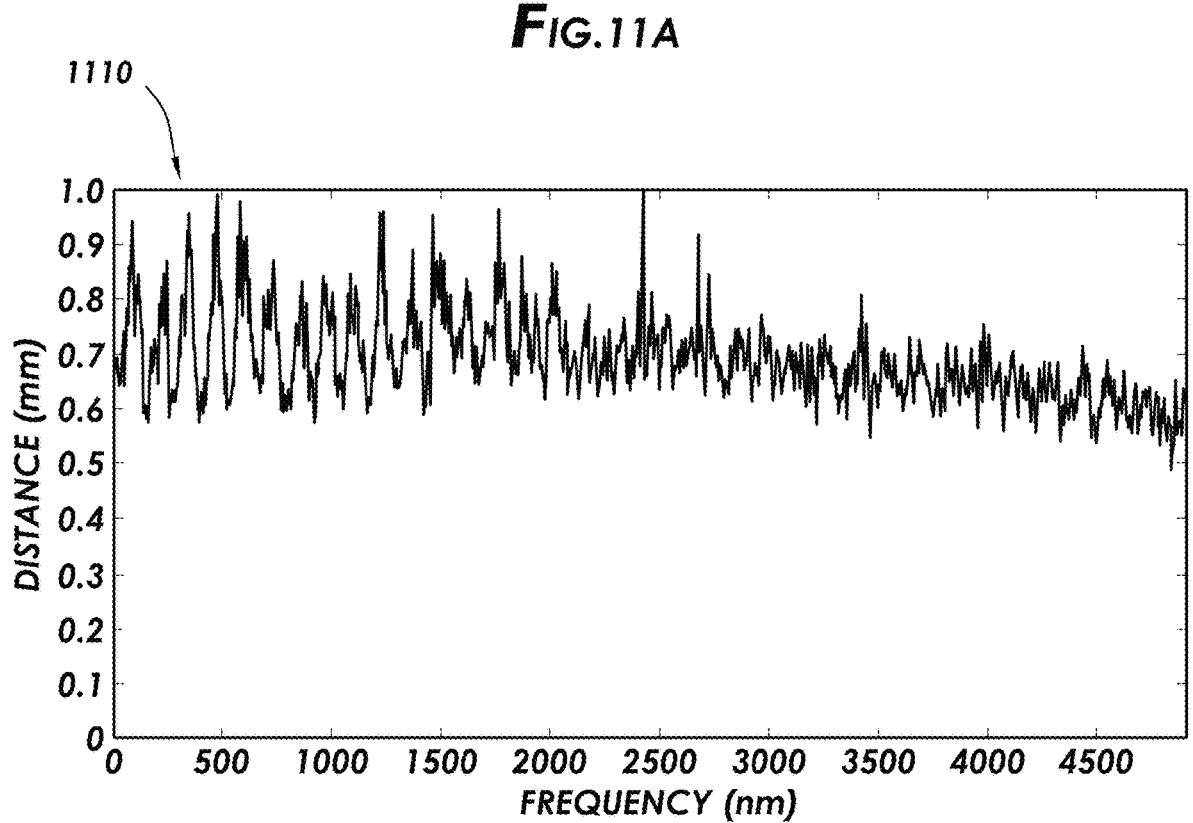

FIG. 11A shows an image 1100 observed on the curved surface 1006. The image 1100 has a high contrast; however, the frequency of the image 1100 decreases as the surface curves, resulting in a loss of contrast as shown by fringes 1102. FIG. 11B shows a graph 1110 of the frequency of a middle portion of the image 1100.

Figure 12:
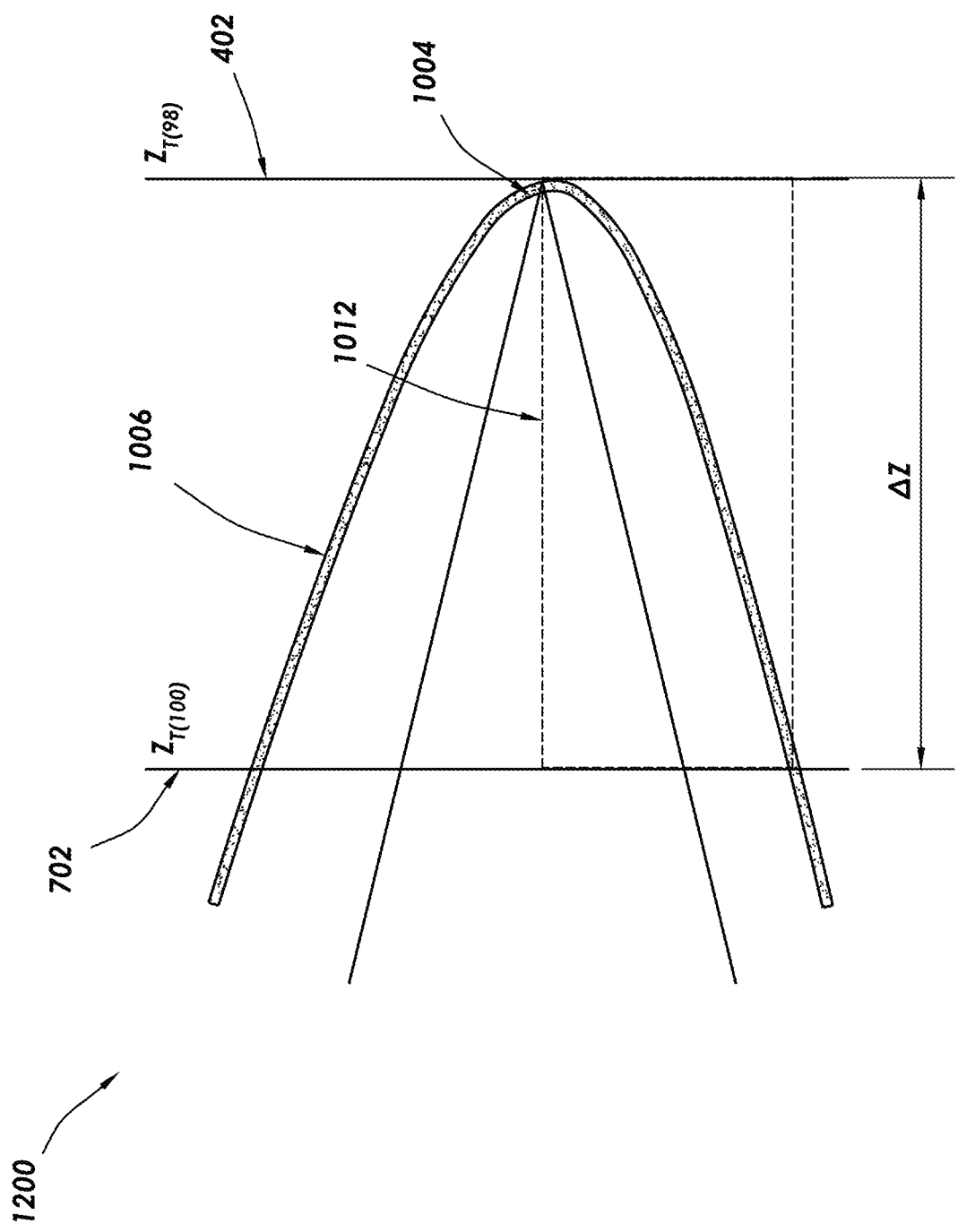
FIG. 12 shows a schematic of the second grating in a first position in accordance with at least some embodiments.
Figure 13A:
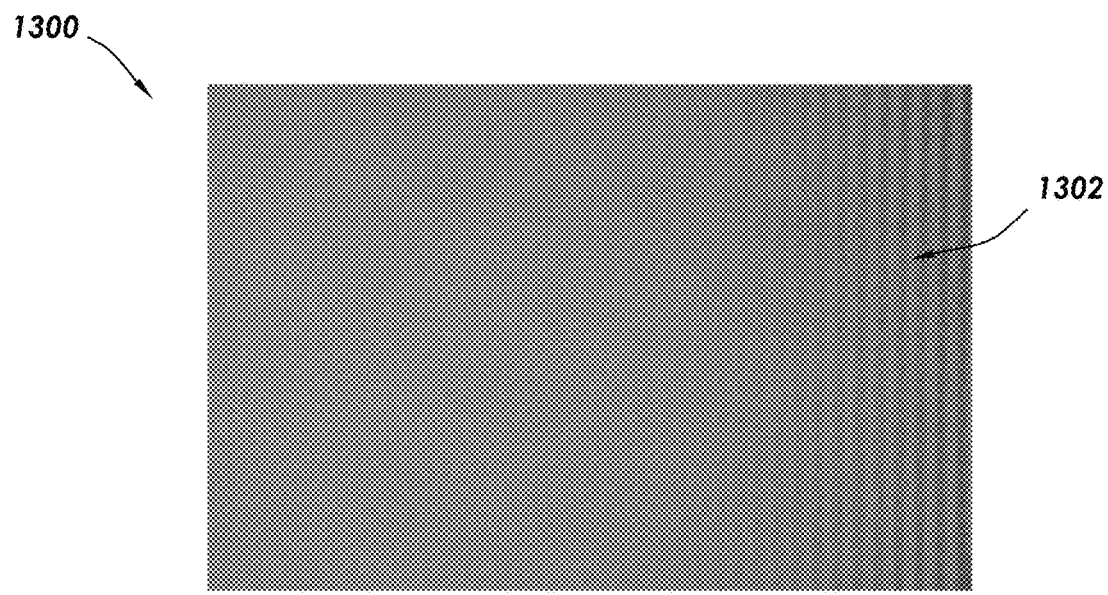
FIG. 13A shows an image of the second grating that is formed from observing a curved surface below the axis and FIG. 13B shows a graph of the profile measured in a middle portion of the image in accordance with at least some embodiments.
Figure 13B:
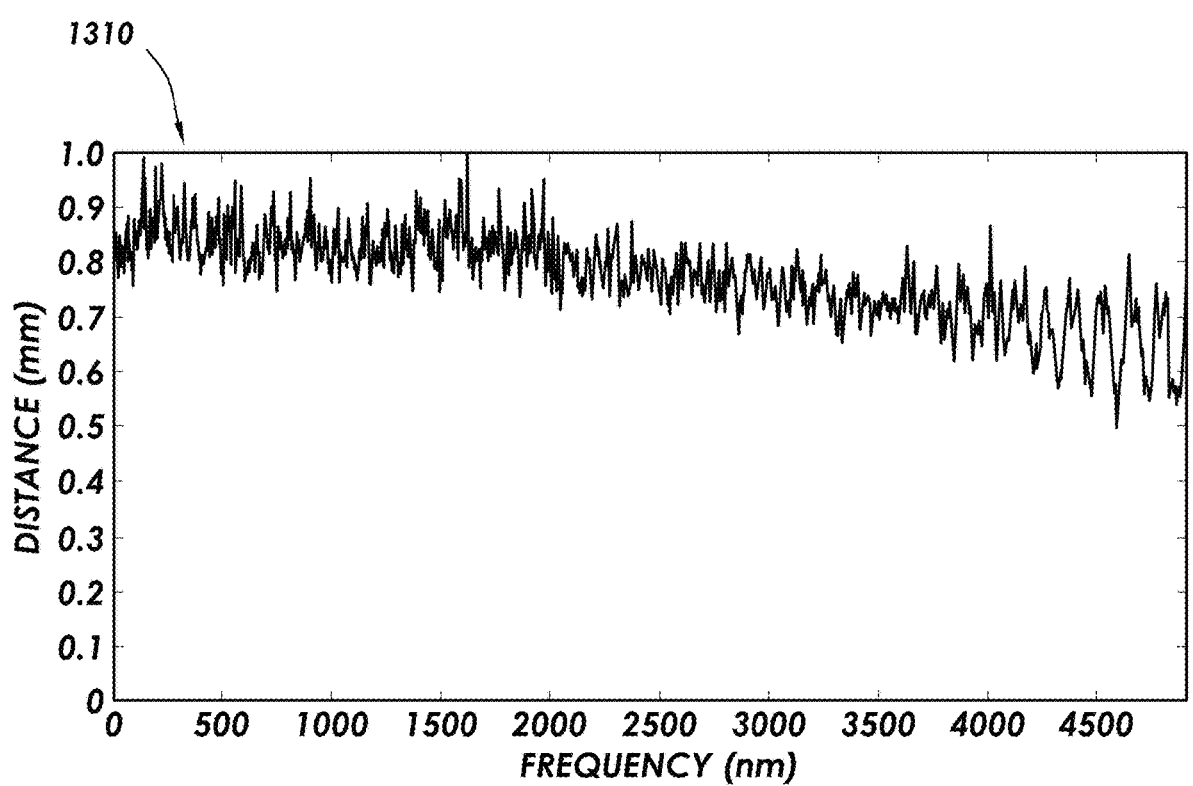

The system 300 can be configured to use different diffraction gratings. For example, the system 300 can use the first grating 502 with a frequency of 98 lines/inch, the second grating 702 with a frequency of 100 lines/inch, or any other desired diffraction grating. FIG. 12 shows a schematic of the second grating 702 with the focus over the vertex of the surface in the second zone 1012. FIG. 13A shows an image 1300 with a pattern of fringes 1302. The area near the self-image plane 708 has improved visibility, with loss towards the vertex area. In other words, the self-image includes a pattern of high contrast. FIG. 13B shows the corresponding graph of a middle portion of the frequency of the image 1300.

The second position of the self-image plane provides an axial measure of the second observation point on the curved surface 1006. The system 300 can be configured to adjust the focus to match the position of the second self-image as is shown schematically by a line 1402 in FIG. 14.

Figure 15A:
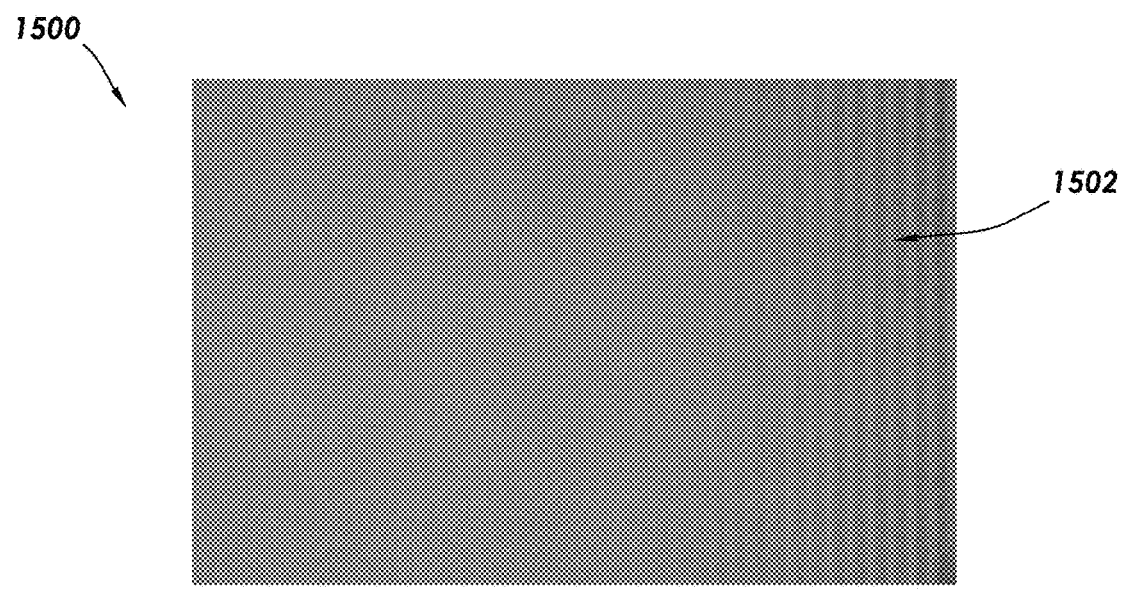
FIG. 15A shows an image of the second grating that is formed from observing the curved surface focused below an apex and FIG. 15B shows a graph of the profile measured in a middle portion of the image in accordance with at least some embodiments.
Figure 15B:
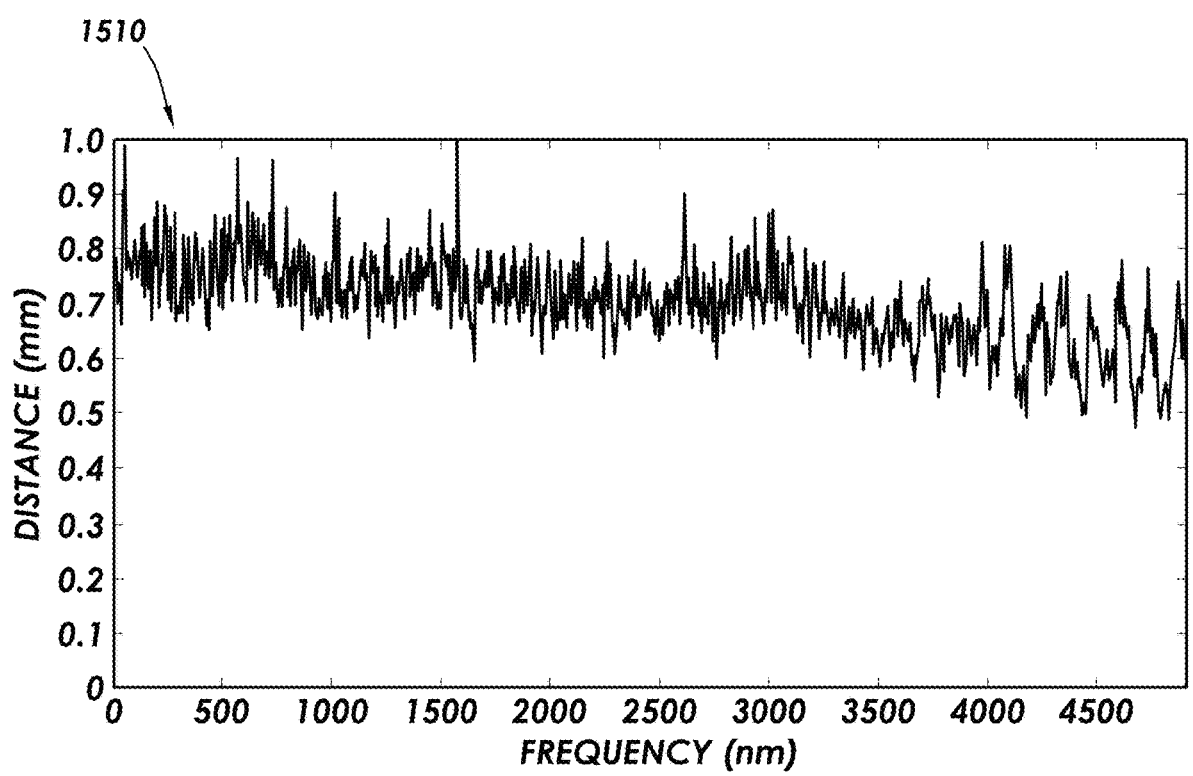

As shown in FIG. 15A, image 1500 has a high-contrast fringe 1502. The high-contrast fringes 1502 degrade toward the apex of the curved surface 1006. The degradation effect on the fringes 1502 may result from the presence of the curved surface (e.g., rather than from the focusing process).

The system 300 can be configured to focus the self-image plane of the second grating 702 (e.g., a frequency of 100 lines/inch). The system 300 can remove the curved surface 1006 and substitute it with a flat surface. In doing so, the high contrast can be provided across the measurement area. In other words, the effect of progressive loss of contrast due to the presence of the curved surface is reduced.

Figure 16A:
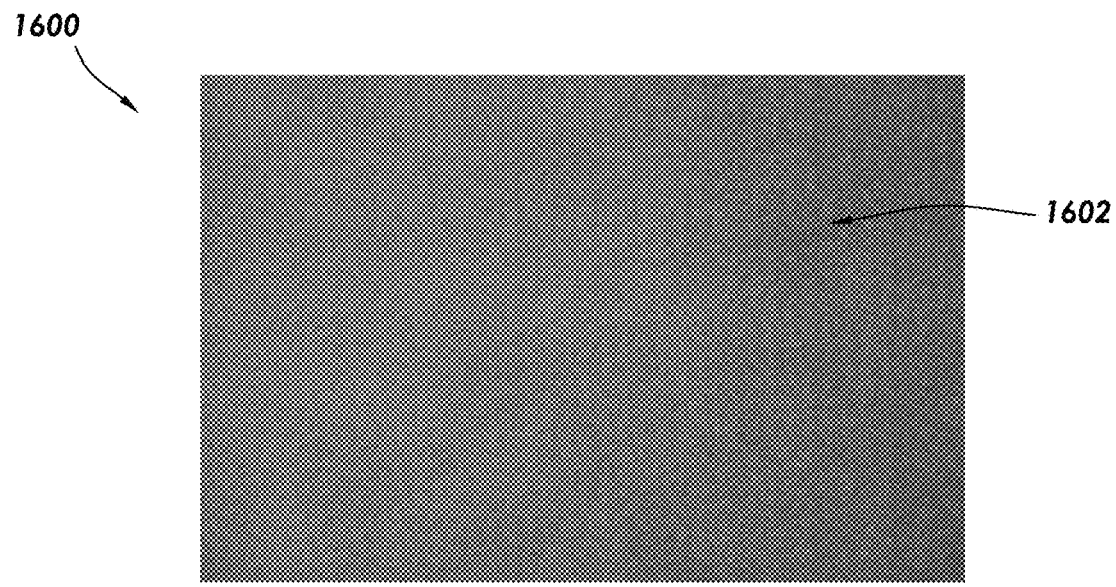
FIG. 16A shows an image of the second grating that is formed from observing the curved surface below the axis and FIG. 16B shows a graph of the profile measured in a middle portion of the image in accordance with at least some embodiments.
Figure 16B:
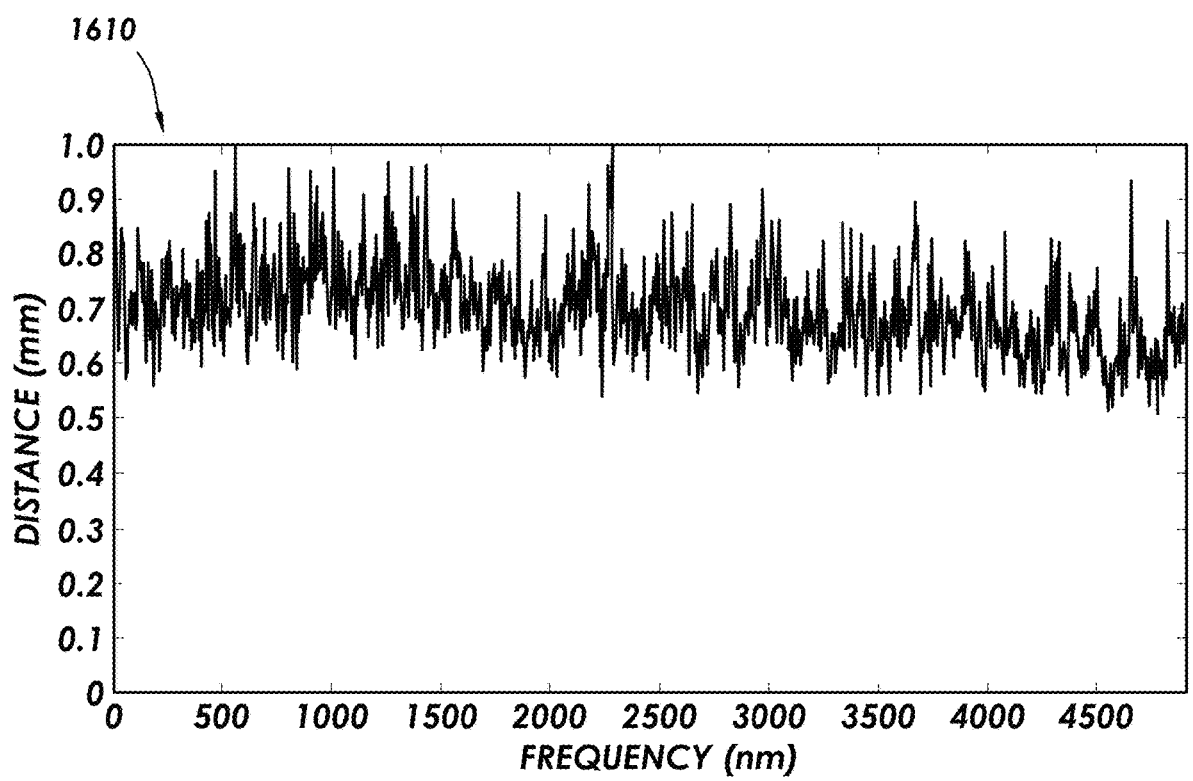

The system 300 can detect the distance of the position of the vertex of the curved surface and use the flat surface detected in the position. FIG. 16A shows a diffraction pattern observed at the vertex of the curved surface 1006 while the system 300 is focused at the second grating. The image 1600 exhibits low contrast. The loss of contrast may be an effect of the curved surface.

The system 300 can evaluate the results of the contrast using different gratings and/or at different focal points. The system 300 can apply equation 1 to calculate the axial position of the two points on the surface being measured. The system 300 can determine the ΔZ displacement by using equation 2:

$$\Delta Z = Z_{T(98)} - Z_{T(100)} = 9 \text{ mm} \quad (2)$$

Figure 17:
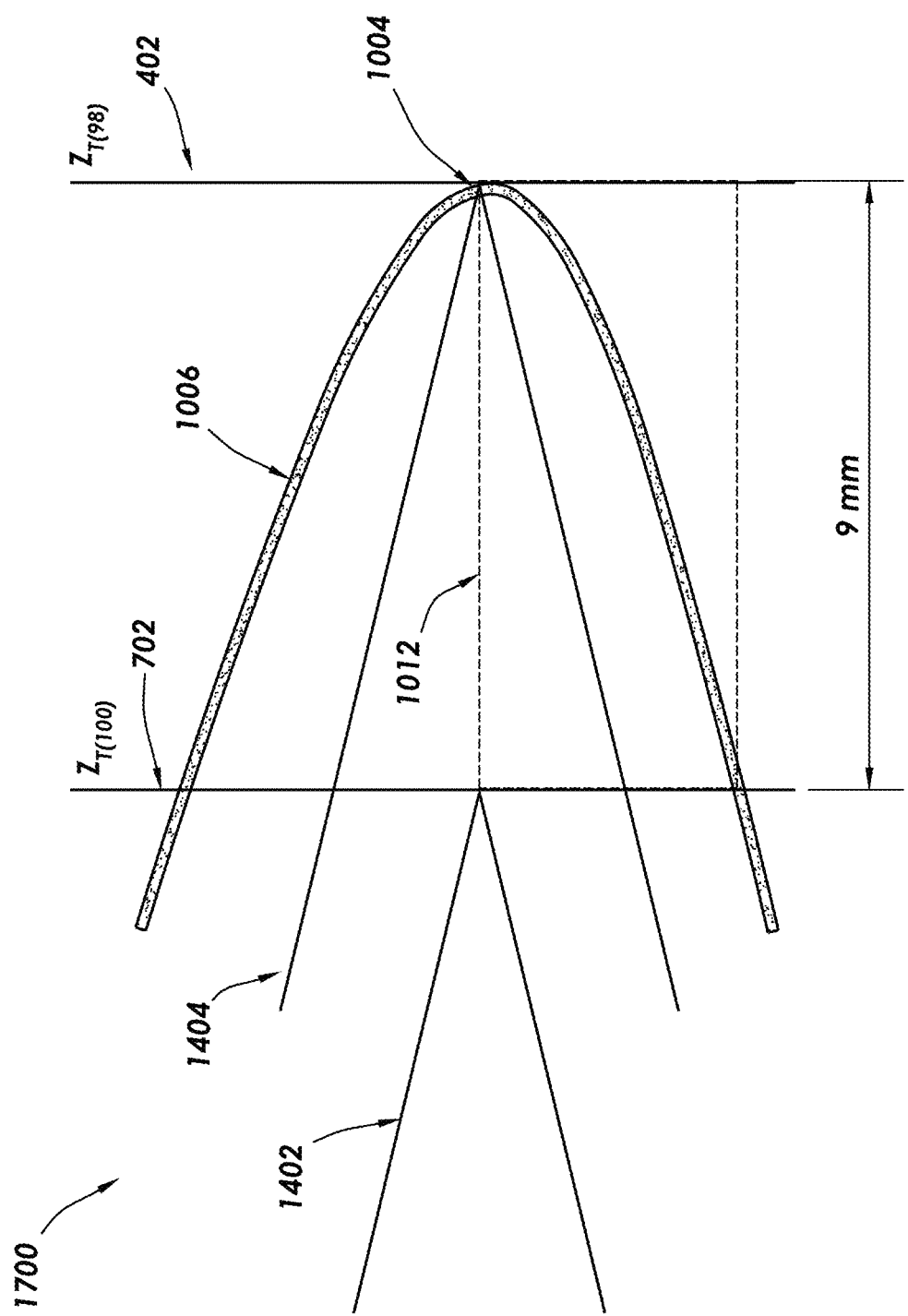
FIG. 17 shows a schematic of a calculation pertaining to measurements of two points along a curved surface in accordance with at least some embodiments.

FIG. 17 shows schematically equation 2. The processing device 2020 can use equation 2 to determine and measure the axial distance over two positions on a surface. For example, the net displacement ΔZ of the self-image plane relative to the focal point (e.g., a focal plane) is equivalent to the axial distance over two positions on a surface (e.g., at the fringes) of the first and second gratings. The processing device 2002 can calculate the difference of the first and second positions of the self-image planes 408, 708 as observed in the zone 1012. Graph 1700 shows that the distance between a vertex of lines 1402 and the vertex of lines 1404 (e.g., a distance of 9 mm).

The system 300 can be configured to measure an intermediate point (e.g., a third position on the surface). The system 300 can use diffraction gratings with a finer variation in frequency. For example, the system 300 may include the LCD with a pixel size of fewer than 10 microns.

Figure 18:
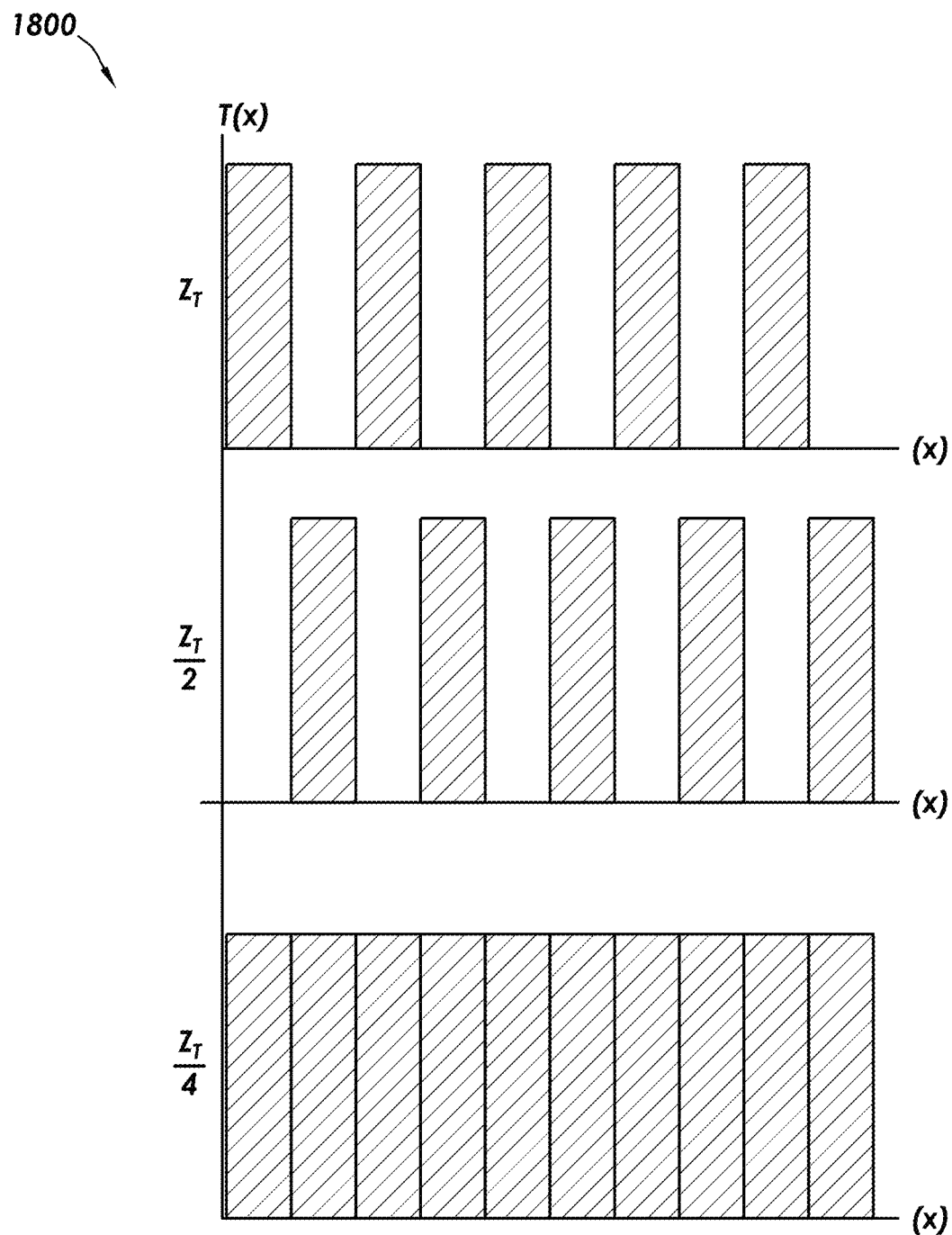
FIG. 18 shows different diffraction patterns observed various distances along the direction of propagation in accordance with at least some embodiments.

As shown in FIG. 18, the system 300 may use gratings having different types of detectable patterns. For example, the grating may be a Ronchi grating, for which the opening ratio is 0.5 or any other desired opening ratio. The system 300 can use one or more gratings to generate two types of detectable patterns, which unfold between two self-images: namely $Z_T/4$, $Z_T/2$ and $3Z_T/4$ (e.g., comparable to $Z_T/4$). $Z_T$ represents the Talbot lengths.

Figure 19:
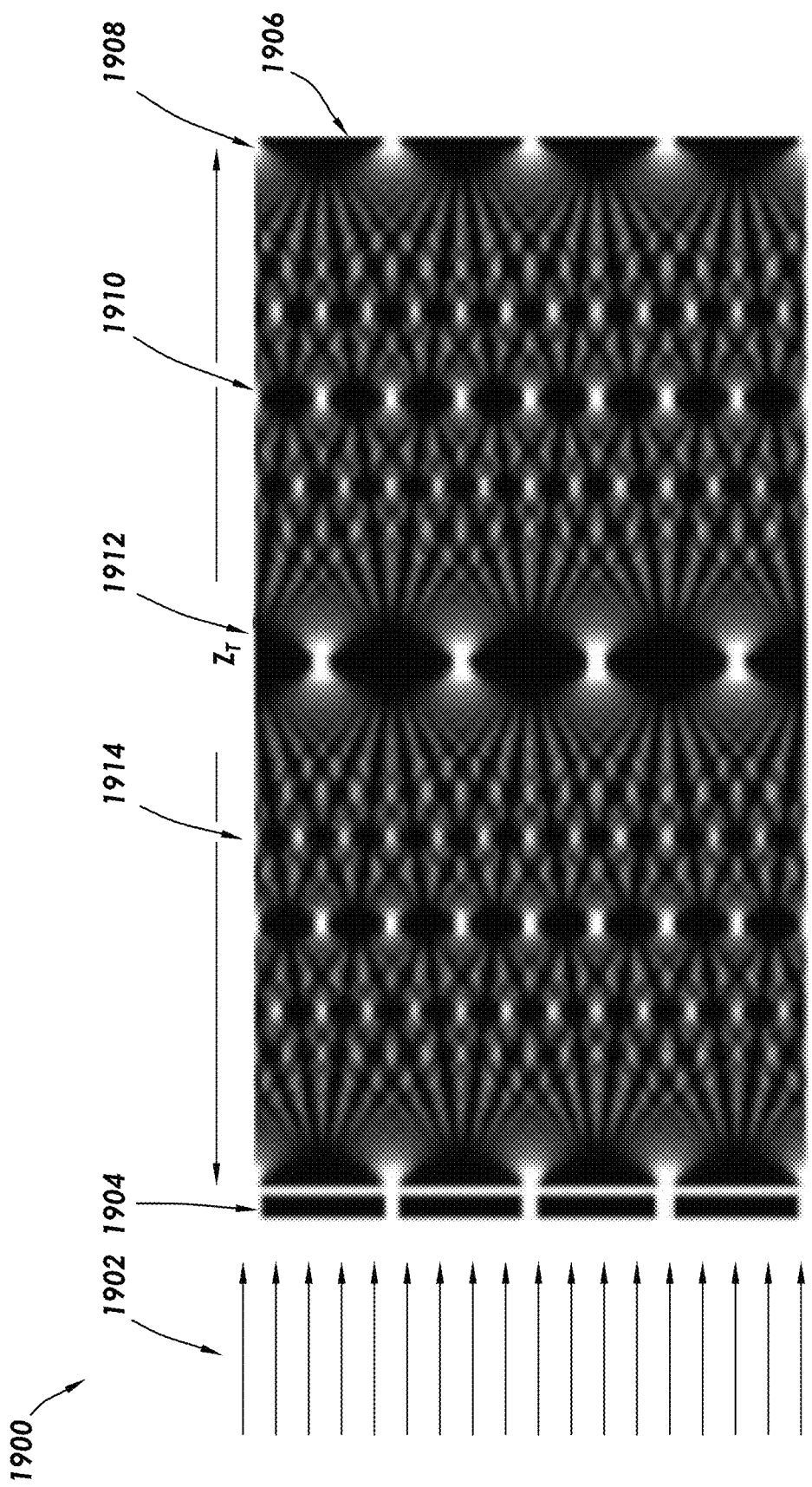
FIG. 19 shows a schematic of diffraction patterns observed between self-images for an opening ratio of 1/8.

The system 300 can be configured to measure a calibration matrix and develop a measurement algorithm. The system 300 can calculate the intermediate positions using contrast variation from the calibration matrix. The artificial intelligence engine and/or machine learning engine may be trained to measure the calibration matrix to develop the measurement algorithm. The system 300 can vary the opening ratio of the diffraction gratings to a value different from ½. As shown in FIG. 19, when the system 300 varies the opening ratio, the number of identifiable patterns (high contrast) increase. The schematic 1900 shows an illuminating plane wave 1902 traversing a grating 1904 to produce an image 1906 with identifiable patterns. The Talbot pattern is self-images of phase grating. The diffraction pattern repeats itself at the planes of integer multiple Talbot lengths. In this example, the patterns include a primary Talbot image 1908, a double-frequency fractional image 1910, a secondary Talbot image 1912, and a triple frequency fractional image 1914. Depending on the value of the opening ratio, there may be additional and/or fewer identifiable patterns. The system 300 can use the identifiable patterns to generate 3-D images. The artificial intelligence engine and/or machine learning engine may be trained to detect and use the identifiable patterns to generate one or more 3-D images.

The system 300 can use the Talbot effect to detect changes in the curvature of the object. The system 300 can conduct a Z-Scan using the dependence of the self-images positions along the propagation as a function of λ and d (see equation 1). The system 300 use the detected contrast of the pattern of fringes to determine the curvature of the object and produce a 3-D image of the surface.

The system 300 can measure profiles of surfaces with regular curvature (e.g., with symmetry of revolution). The systems and methods describe herein can be applied to irregular surfaces without symmetry of revolutions. The system 300 can be configured to rotate the grating around the optical axis in order to analyze objects without circular symmetry and obtain different measurements. The system 300 can use an LCD or any other desired display to vary the period of the diffraction grating in real time. The system 300 can be configured to measure of the contrast variation as a function of the wavelength of the incident radiation, and maintaining fixed the period of the grating displayed by a LCD. For example, the system 300 may include a tunable laser in the visible region. The system 300 may include additional and/or fewer components and are not limited by those disclosed herein.

Software and Hardware

Figure 20:
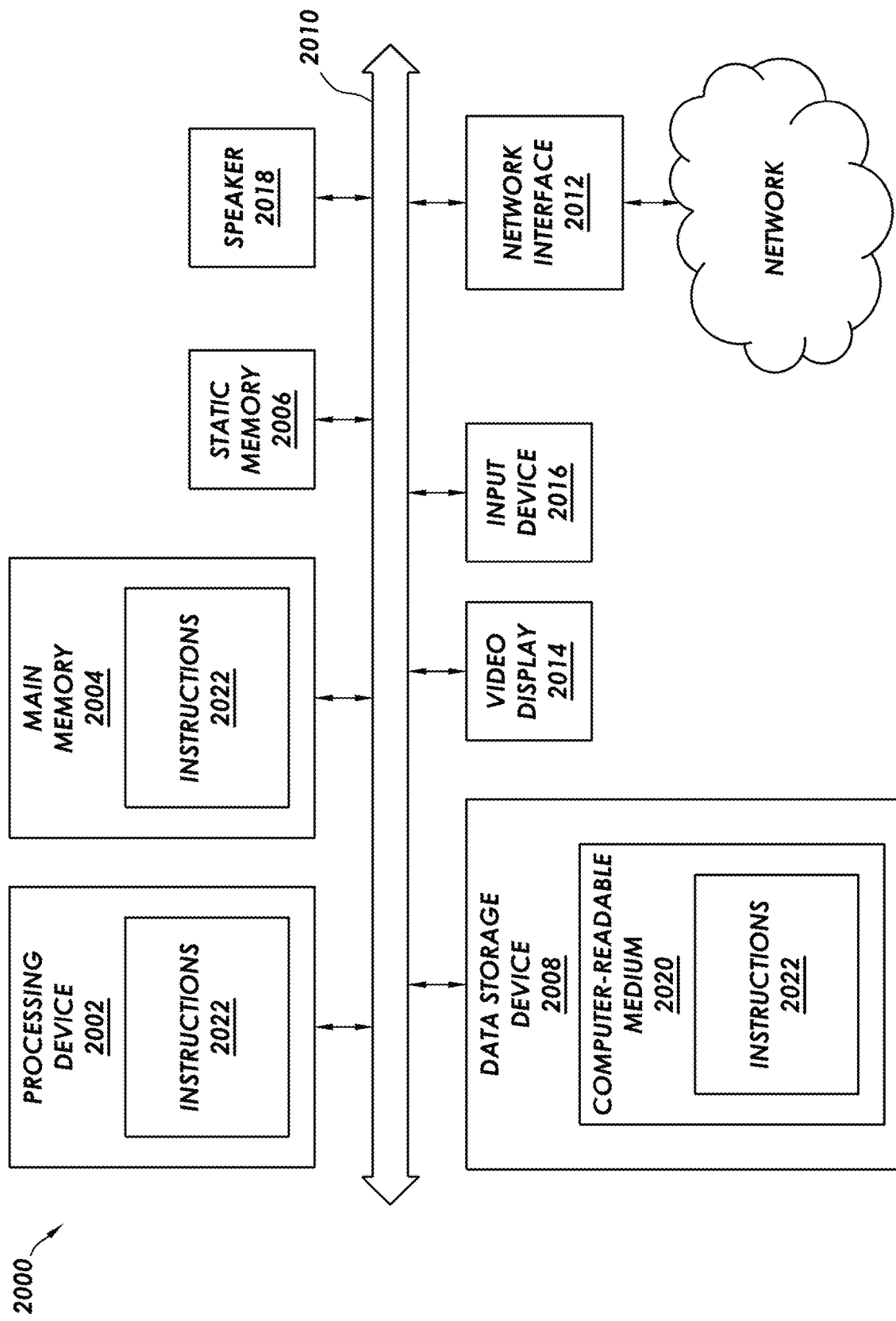
FIG. 20 shows a computer system in accordance with at least some embodiments.

FIG. 20 shows an example computer system 2000. In one example, computer system 2000 may correspond to the surgical controller 118, a tablet device within the surgical room, or any other system that implements any or all the various methods discussed in this specification. The computer system 2000 may be connected (e.g., networked) to other computer systems in a local-area network (LAN), an intranet, and/or an extranet (e.g., device cart 102 network), or at certain times the Internet (e.g., when not in use in a surgical procedure). The computer system 2000 may be a server, a personal computer (PC), a tablet computer or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2000 includes a processing device 2002, a main memory 2004 (e.g., read-only memory (ROM), flash memory, dynamic random access memory (DRAM) such as synchronous DRAM (SDRAM)), a static memory 2006 (e.g., flash memory, static random access memory (SRAM)), and a data storage device 2008, which communicate with each other via a bus 2010.

Processing device 2002 represents one or more general-purpose processing devices such as a microprocessor, central processing unit, or the like. More particularly, the processing device 2002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2002 may also be one or more special-purpose processing devices such as an application specific integrated circuit (ASIC), a field programmable gate array (FPGA), a digital signal processor (DSP), network processor, or the like. The processing device 2002 is configured to execute instructions for performing any of the operations and steps discussed herein. Once programmed with specific instructions, the processing device 2002, and thus the entire computer system 2000, becomes a special-purpose device, such as the surgical controller 118.

The computer system 2000 may further include a network interface device 2012 for communicating with any suitable network (e.g., the device cart 102 network). The computer system 2000 also may include a video display 2014 (e.g., display device 114), one or more input devices 2016 (e.g., a microphone, a keyboard, and/or a mouse), and one or more speakers 2018. In one illustrative example, the video display 2014 and the input device(s) 2016 may be combined into a single component or device (e.g., an LCD touch screen).

The data storage device 2008 may include a computer-readable storage medium 2020 on which the instructions 2022 (e.g., implementing any methods and any functions performed by any device and/or component depicted described herein) embodying any one or more of the methodologies or functions described herein is stored. The instructions 2022 may also reside, completely or at least partially, within the main memory 2004 and/or within the processing device 2002 during execution thereof by the computer system 2000. As such, the main memory 2004 and the processing device 2002 also constitute computer-readable media. In certain cases, the instructions 2022 may further be transmitted or received over a network via the network interface device 2012.

While the computer-readable storage medium 2020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 21:
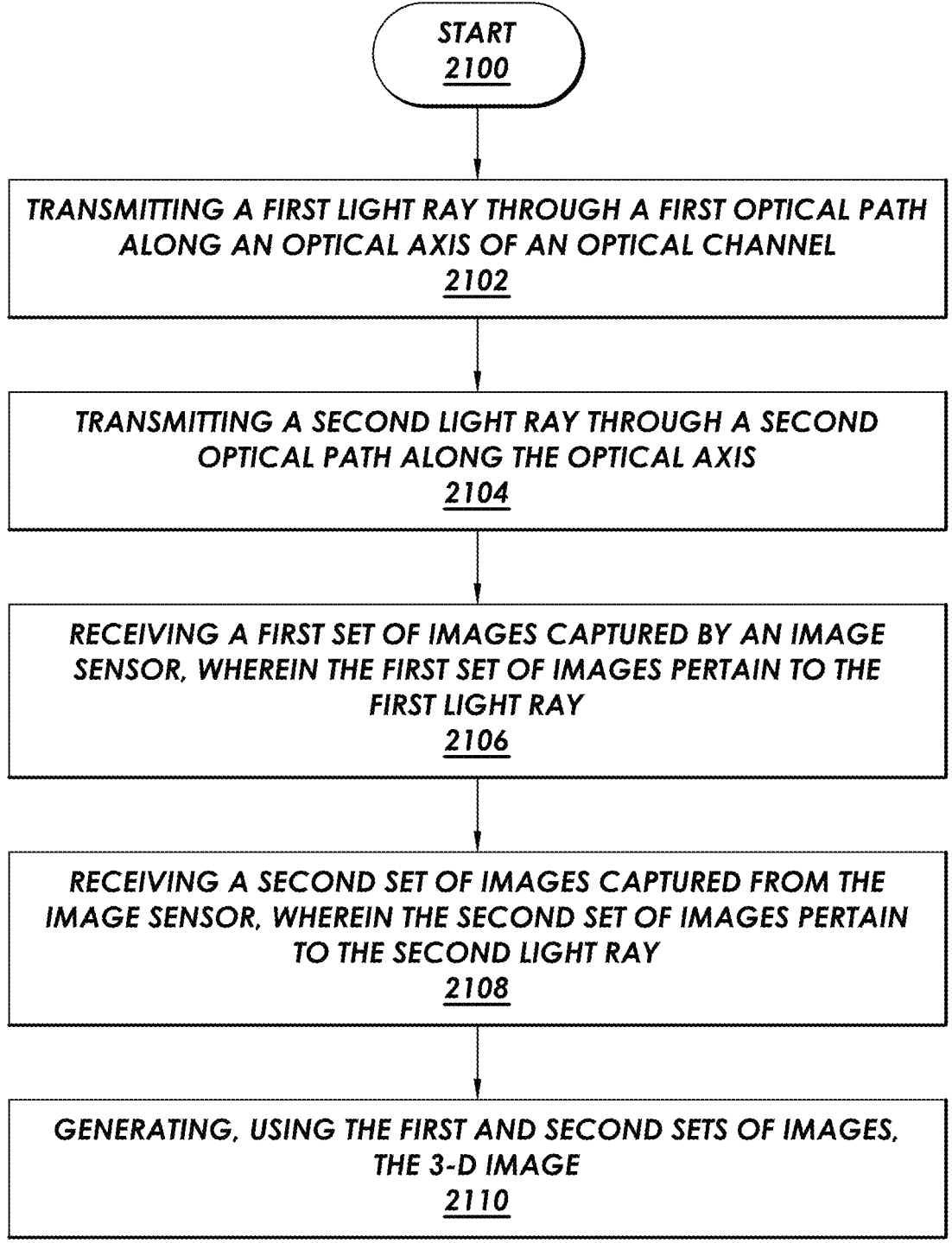
FIG. 21 shows a method of generating a 3-D image of an object in accordance with at least some embodiments.

FIG. 21 shows a method of generating a 3-D image of an object in accordance with at least some embodiments. In particular, the method starts (block 2100) and may comprise: transmitting a first light ray through a first optical path along an optical axis of an optical channel (block 2102); transmitting a second light ray through a second optical path along the optical axis (block 2104); receiving a first set of images captured by an image sensor, wherein the first set of images pertain to the first light ray (block 2106); receiving a second set of images captured from the image sensor, wherein the second set of images pertain to the second light ray (block 2108); and generating, using the first and second sets of images, the 3-D image (block 2110). Thereafter, the example method ends. Portions of the example method may be implemented by computer instructions executed with the processing device 2002, such as the surgical controller 118 (FIG. 1), a microcontroller (e.g., an LCD), a micro-mirror array, or any other desired device.

Figure 22:
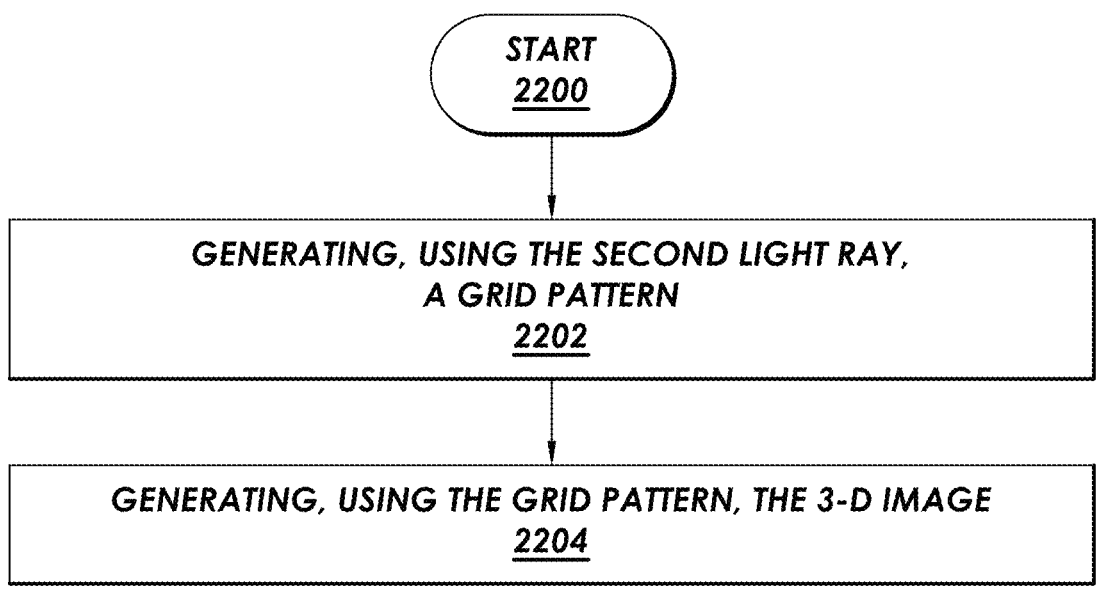
FIG. 22 shows a method of generating a 3-D image of an object in accordance with at least some embodiments.

FIG. 22 shows a method of generating a 3-D image of an object in accordance with at least some embodiments. In particular, the method starts (block 2200) and may comprise: generating, using the second light ray, a grid pattern (block 2202); adjusting a density of the grid pattern (block 2204); and generating, using the grid pattern, the 3-D image (block 2206). Thereafter, the example method ends. Portions of the example method may be implemented by computer instructions executed with the processing device 2002, such as the surgical controller 118 (FIG. 1), a microcontroller (e.g., an LCD), a micro-mirror array, or any other desired device.

Figure 23:
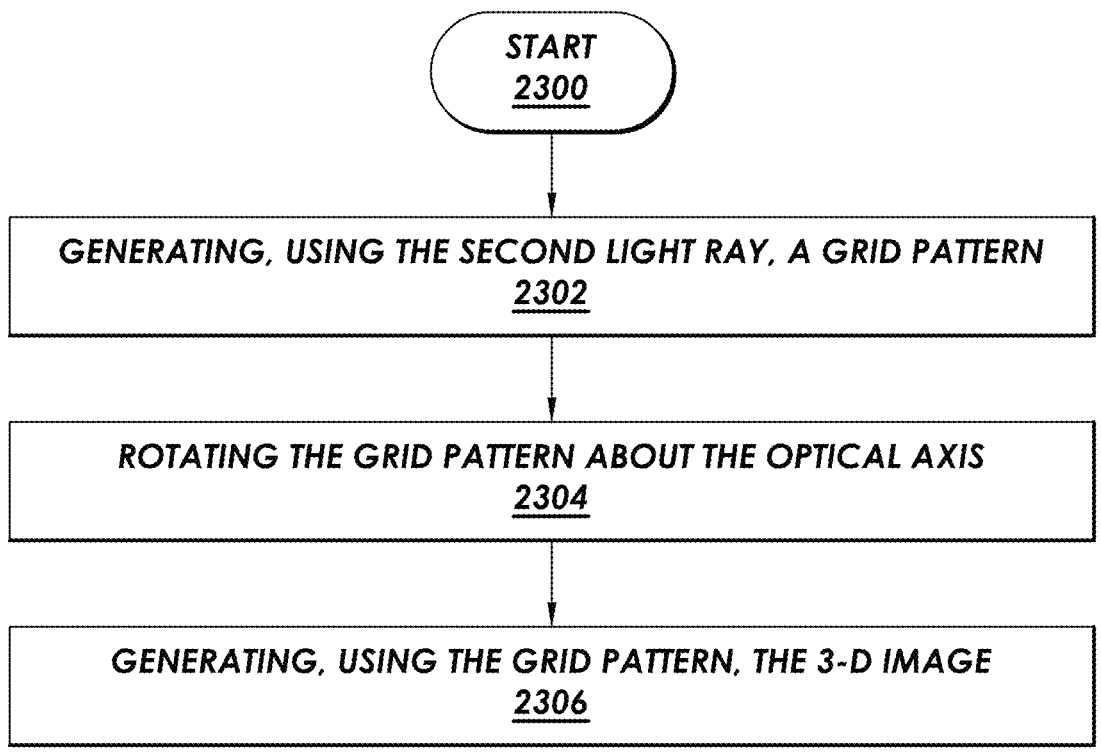
FIG. 23 shows a method of rotating a display to generate a 3-D image of an object in accordance with at least some embodiments.

FIG. 23 shows a method of rotating a display to generate a 3-D image of an object in accordance with at least some embodiments. In particular, the method starts (block 2300) and may comprise: generating, using the second light ray, a grid pattern (block 2302); rotating the grid pattern about the optical axis (block 2304); generating, using the grid pattern, the 3-D image (block 2306). Thereafter, the example method ends. Portions of the example method may be implemented by computer instructions executed with the processing device 2002, such as the surgical controller 118 (FIG. 1), a microcontroller (e.g., an LCD), a micro-mirror array, or any other desired device.

FIGS. 21-23 are not intended to be limiting: the methods 2100, 2200, and 2300 can include more or fewer steps and/or processes than those illustrated in FIGS. 21-23. Further, the order of the steps of the methods 2100, 2200, and 2300 is not intended to be limiting; the steps can be arranged in any suitable order. Any or all of the steps of methods 2100, 2200, and 2300 may be implemented during a surgical procedure or at any other desired time.

Consistent with the above disclosure, the examples of systems and method enumerated in the following clauses are specifically contemplated and are intended as a non-limiting set of examples.

Clause 1. A system for an endoscope, comprising:
a camera head coupled to an optical channel;
a light port coupled to the endoscope and configured to receive a first light ray, wherein the first light ray travels through a first optical path along an optical axis of the optical channel;
a depth measurement module coupled to the endoscope, wherein the depth measurement module is configured to transmit a second light ray through a second optical path along the optical axis;
an image sensor coupled to the camera head and configured to receive a first set of images pertaining to the first light ray and a second set of images pertaining to the second light ray; and a processing device configured to receive the first and second sets of images from the image sensor and use the first and second sets of images to generate one or more three-dimensional (3-D) images.

Clause 2. The system of any clause, wherein the depth measurement module comprises:
a light source configured to transmit the second light ray;
an objective lens configured to collimate the second light ray;
a microcontroller configured to generate a grid pattern;
a Liquid Crystal Display (LCD) configured to display the grid pattern; and
a beam splitter configured to reflect at least a portion of the second light ray through the optical channel.

Clause 3. The system of any clause, wherein the processing device is further configured to generate, using the grid pattern, the one or more 3-D images.

Clause 4. The system of any clause, wherein the microcontroller is configured to adjust at least one of a density of the grid pattern or a rotation of the grid pattern displayed on the LCD.

Clause 5. The system of any clause, wherein the first optical path is disposed at least between a distal end of the endoscope and the camera head.

Clause 6. The system of any clause, wherein the first set of images comprise two-dimensional (2-D) images.

Clause 7. The system of any clause, wherein the second set of images comprise depth information.

Clause 8. The system of any clause, wherein the first and second light rays comprise different portions of an electromagnetic spectrum.

Clause 9. The system of any clause, wherein the first light ray is a white light and the second light ray is an ultraviolet (UV) ray or an infrared ray.

Clause 10. The system of any clause, further comprising a second sensor configured to receive the second light ray.

Clause 11. The system of any clause, wherein the processing device is configured to use at least one of distortion and phase information obtained from the second set of images to generate the one or more 3-D images.

Clause 12. The system of any clause, further comprising:
a micro-mirror array configured to generate a grid pattern, wherein the processing device is configured to generate, using the grid pattern, the one or more 3-D images.

Clause 13. The system of any clause, wherein the processing device is configured to generate, via an artificial intelligence engine, a machine learning model trained to adjust at least one of a density of a grid pattern or a rotation of the grid pattern displayed on an LCD.

Clause 14. A method of generating a three-dimensional (3-D) image of an object, comprising:
transmitting a first light ray through a first optical path along an optical axis of an optical channel;
transmitting a second light ray through a second optical path along the optical axis;
receiving a first set of images captured by an image sensor, wherein the first set of images pertain to the first light ray;
receiving a second set of images captured from the image sensor, wherein the second set of images pertain to the second light ray; and generating, using the first and second sets of images, the 3-D image.

Clause 15. The method of any clause, further comprising: generating, using the second light ray, a grid pattern; rotating the grid pattern about the optical axis; and generating, using the grid pattern, the 3-D image.

Clause 16. The method of any clause, further comprising: generating, using the second light ray, a grid pattern; adjusting a density of the grid pattern; and generating, using the grid pattern, the 3-D image.

Clause 17. The method of any clause, further comprising: generating, via an artificial intelligence engine, a machine learning model trained to generate image data based on at least one of the first and second sets of images and a grid pattern.

Clause 18. The method of any clause, wherein the first optical path and a section of the second optical path are disposed in the optical channel.

Clause 19. A system for an endoscope, comprising:
a camera head coupled to an optical channel;
a light port coupled to the endoscope and configured to receive a first light ray, wherein the first light ray travels through a first optical path along an optical axis of the optical channel;
a depth measurement module coupled to the endoscope, wherein the depth measurement module is configured to generate a grid pattern and transmit the grid pattern and a second light ray toward a beam splitter, wherein the beam splitter is configured to reflect at least a portion of the grid pattern and the second light ray through the optical axis;
an image sensor configured to receive a first set of images captured from the camera, wherein the first set of images pertain to the first light ray;
a second image sensor configured to receive a second set of images captured from the camera, wherein the second set of images pertain to the second light ray; and
a processing device configured to receive the first and second sets of images and the grid pattern from the image sensors and use the first and second sets of images and the grid pattern to generate one or more three-dimensional (3-D) images.

Clause 20. The system any clause, wherein the processing device is configured to generate, via an artificial intelligence engine, a machine learning model trained to generate image data based on at least one of the first and second sets of images and the grid pattern.

Consistent with the above disclosure, the examples of assemblies enumerated in the following clauses are specifically contemplated and are intended as a non-limiting set of examples.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for an endoscope, comprising:
a camera head coupled to an optical channel;
a light port coupled to the endoscope and configured to receive a first light ray, wherein the first light ray travels through a first optical path along an optical axis of the optical channel;
a depth measurement module coupled to the endoscope, wherein the depth measurement module is configured to transmit a second light ray through a second optical path along the optical axis and includes a light source configured to transmit the second light ray and a microcontroller coupled to a Liquid Crystal Display (LCD) configured to generate a grating through which the second light ray passes to project a grid pattern on a surface;
an objective lens configured to collimate the second light ray;
an image sensor coupled to the camera head and configured to receive a first set of images pertaining to the first light ray and a second set of images pertaining to the second light ray; and
a processing device configured to receive the first and second sets of images from the image sensor and use the first and second sets of images to generate one or more three-dimensional (3-D) images of the surface, wherein the processing device adjusts a density of the grid pattern using the LCD to displace a focal point of the objective lens and varies a distance between self-images of the grating and the focal point of the objective lens to obtain depth information of the surface.

2. The system of claim 1, wherein the depth measurement module comprises a beam splitter configured to direct at least a portion of the second light ray through the optical channel.

3. The system of claim 2, wherein the processing device is further configured to generate, using the grid pattern, the one or more 3-D images.

4. The system of claim 2, wherein the microcontroller is configured to adjust a rotation of the grid pattern using the LCD.

5. The system of claim 1, wherein the second optical path is disposed at least between a distal end of the endoscope and the camera head.

6. The system of claim 1, wherein the first set of images comprise two-dimensional (2-D) images.

7. The system of claim 1, wherein the second set of images comprise the depth information.

8. The system of claim 1, wherein the first and second light rays comprise different portions of an electromagnetic spectrum.

9. The system of claim 1, wherein the first light ray is a white light and the second light ray is an ultraviolet (UV) ray or an infrared ray.

10. The system of claim 9, further comprising a second sensor configured to receive the second light ray.

11. The system of claim 1, wherein the processing device is configured to use at least one of distortion and phase information obtained from the second set of images to generate the one or more 3-D images.

12. The system of claim 1, wherein the processing device is configured to generate, via an artificial intelligence engine, a machine learning model trained to adjust at least one of the density of the grid pattern or a rotation of the grid pattern displayed on the LCD.

13. A method of generating a three-dimensional (3-D) image of an object, comprising:
transmitting a first light ray through a first optical path associated with an optical axis of an optical channel;
transmitting a second light ray through a second optical path associated with the optical axis;
passing the second light ray through a grating generated using a microcontroller coupled to a Liquid Crystal Display (LCD) to form a grid pattern;
projecting the grid pattern on a surface;

receiving a first set of images captured by an image sensor, wherein the first set of images pertain to the first light ray;

receiving a second set of images captured from the image sensor, wherein the second set of images pertain to the second light ray and the grid pattern;

adjusting a density of the grid pattern using the LCD to displace a focal point of an objective lens configured to collimate the second light ray;

varying a distance between self-images of the grating and the focal point of the objective lens to obtain depth information of the surface;

generating, using the first and second sets of images, the 3-D image of the surface.

14. The method of claim 13, further comprising:
rotating the grid pattern about the optical axis; and
generating, using the grid pattern, the 3-D image.

15. The method of claim 13, further comprising
generating, using the grid pattern, the 3-D image.

16. The method of claim 13, further comprising:
generating, via an artificial intelligence engine, a machine learning model trained to generate image data based on at least one of the first and second sets of images and the grid pattern.

17. The method of claim 13, wherein the first optical path and a section of the second optical path are disposed in the optical channel.

18. A system for an endoscope, comprising:
a camera head coupled to an optical channel;
a light port coupled to the endoscope and configured to receive a first light ray, wherein the first light ray travels through a first optical path along an optical axis of the optical channel;
a depth measurement module coupled to the endoscope and including a microcontroller coupled to a Liquid Crystal Display (LCD), wherein the depth measurement module is configured to generate a grating using the microcontroller and the LCD and pass a second light ray through the LCD to create a grid pattern and transmit the grid pattern toward a beam splitter, wherein the beam splitter is configured to reflect at least a portion of the grid pattern through the optical axis and onto a surface;
an objective lens configured to collimate the second light ray;
an image sensor configured to receive a first set of images captured from the camera head, wherein the first set of images pertain to the first light ray;
a second image sensor configured to receive a second set of images captured from the camera head, wherein the second set of images pertain to the second light ray and the grid pattern; and
a processing device configured to receive the first and second sets of images and the grid pattern from the image sensors and use the first and second sets of images and the grid pattern to generate one or more three-dimensional (3-D) images of the surface, wherein the processing device adjusts a density of the grid pattern using the LCD to displace a focal point of the objective lens and varies a distance between self-images of the grating and the focal point of the objective lens to obtain depth information of the surface.

19. The system of claim 18, wherein the processing device is configured to generate, via an artificial intelligence engine, a machine learning model trained to generate image data based on at least one of the first and second sets of images and the grid pattern.

20. The system of claim 1, wherein the processing device is configured to:
calculate a displacement of the focal point relative to the self-images of the grating; and
generate the one or more three-dimensional (3-D) images of the surface based on the displacement.

* * * * *